US006633560B1

(12) United States Patent
Albert et al.

(10) Patent No.: US 6,633,560 B1
(45) Date of Patent: Oct. 14, 2003

(54) DISTRIBUTION OF NETWORK SERVICES AMONG MULTIPLE SERVICE MANAGERS WITHOUT CLIENT INVOLVEMENT

(75) Inventors: Mark Albert, Wake Forest, NC (US); Richard A. Howes, Roswell, GA (US); James A. Jordan, Roswell, GA (US); Edward A. Kersey, Alpharetta, GA (US); William M. LeBlanc, Athens, GA (US); Louis F. Menditto, Raleigh, NC (US); Chris O'Rourke, Morrisville, NC (US); Pranav Kumar Tiwari, Raleigh, NC (US); Tzu-Ming Tsang, Chapel Hill, NC (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 09/347,126

(22) Filed: Jul. 2, 1999

(51) Int. Cl.[7] ............................................... H04L 12/28
(52) U.S. Cl. ...................................... 370/351; 370/389
(58) Field of Search ................................ 370/254, 252, 370/230, 351, 389, 395.1, 395.3, 395.32, 395.31, 400, 401, 402, 469

(56) References Cited

U.S. PATENT DOCUMENTS

| | | | |
|---|---|---|---|
| 5,774,660 A | 6/1998 | Brendel et al. | 395/200.31 |
| 5,951,694 A | 9/1999 | Choquier et al. | 714/15 |
| 6,006,264 A | 12/1999 | Colby et al. | 709/226 |
| 6,029,175 A * | 2/2000 | Chow et al. | 707/104.1 |
| 6,128,642 A | 10/2000 | Doraswamy et al. | 709/201 |
| 6,128,657 A | 10/2000 | Okanoya et al. | 709/224 |
| 6,137,777 A | 10/2000 | Vaid et al. | 370/230 |
| 6,185,619 B1 | 2/2001 | Joffe et al. | 709/229 |
| 6,249,801 B1 | 6/2001 | Zisapel et al. | 709/105 |
| 6,263,368 B1 | 7/2001 | Martin | 709/224 |
| 6,327,622 B1 | 12/2001 | Jindal et al. | 709/228 |
| 6,330,602 B1 | 12/2001 | Law et al. | 709/224 |
| 6,370,584 B1 * | 4/2002 | Bestavros et al. | 709/238 |
| 6,446,219 B2 * | 9/2002 | Slaughter et al. | 714/4 |

OTHER PUBLICATIONS

Blake et al., An Architecture fo Differentiated Services, Networking Working Group, RFC 2475, PP:1–30.*
Cisco Policy Based Routing White paper, 1996.*
Mamais et al., Efficient Buffer Managment and Scheduling in a Combined IntServ and DiffServ Architecture, IEEE, 1/99,PP:236 242.*
Information Sciences Institute, "Internet Protocol, DARPA Internet Program Protocol Specification", Univ. of Southern Calif., Marina del Rey, CA. 90291, Sep. 1981.
S. Deering, "Host Extensions for IP Multicasting", Stanford University, Aug. 1989.

* cited by examiner

*Primary Examiner*—David Vincent
(74) *Attorney, Agent, or Firm*—Baker Botts LL.P.

(57) ABSTRACT

A system and method are described for partitioning a network service among a plurality of service managers. The method includes configuring a first service manager to send a first request to a forwarding agent for packets meeting a first criteria and sending the first request to the forwarding agent. A second service manager is configured to send requests to the forwarding agent for packets meeting a second criteria and the second request is sent to the forwarding agent. Packets are checked at the forwarding agent to determine whether the packets meet the first criteria or the second criteria and packets that meet the first criteria are received at the first service manager; and packets that meet the second criteria are received at the second service manager.

22 Claims, 9 Drawing Sheets

|  | INBOUND WILDCARD | DISPATCHED OUTBOUND WILDCARD | DIRECTED OUTBOUND WILDCARD |
|---|---|---|---|
| SOURCE ADDRESS | 0.0.0.0 | 10.10.10.10 | 10.10.10.123 |
| SOURCE MASK | 0.0.0.0 | 255.255.255.255 | 255.255.255.255 |
| DESTINATION ADDRESS | 10.10.10.10 | 0.0.0.0 | 0.0.0.0 |
| DESTINATION MASK | 255.255.255.255 | 0.0.0.0 | 0.0.0.0 |
| SOURCE PORT | 0 | 23 | 23 |
| DESTINATION PORT | 23 | 0 | 0 |

*FIG. 13A*

|  | INBOUND WILDCARD | OUTBOUND WILDCARD |
|---|---|---|
| SOURCE ADDRESS | CLIENT | SERVER |
| SOURCE MASK | CLIENT | SERVER |
| DESTINATION ADDRESS | SERVER | CLIENT |
| DESTINATION MASK | SERVER | CLIENT |
| SOURCE PORT | CLIENT | SERVER |
| DESTINATION PORT | SERVER | CLIENT |

*FIG. 13B*

DISTRIBUTION OF NETWORK SERVICES AMONG MULTIPLE SERVICE MANAGERS WITHOUT CLIENT INVOLVEMENT

CROSS REFERENCE TO RELATED APPLICATIONS

This application is related to U.S. patent application Ser. No. 09/346,634 entitled DISPATCHING PACKETS FROM A FORWARDING AGENT USING TAG SWITCHING; U.S. patent application Ser. No. 09/347,124 entitled CASCADING MULTIPLE SERVICES ON A FORWARDING AGENT; U.S. patent application Ser. No. 09/347,111 entitled LOAD BALANCING USING DISTRIBUTED FORWARDING AGENTS WITH APPLICATION BASED FEEDBACK FOR DIFFERENT VIRTUAL MACHINES; U.S. patent application Ser. No. 09/347,428 entitled GATHERING NETWORK STATISTICS IN A DISTRIBUTED NETWORK SERVICE ENVIRONMENT; U.S. patent application Ser. No. 09/347,122 entitled HANDLING PACKET FRAGMENTS IN A DISTRIBUTED NETWORK SERVICE ENVIRONMENT; U.S. patent application Ser. No. 09/347,108 entitled SENDING INSTRUCTIONS FROM A SERVICE MANAGER TO FORWARDING AGENTS ON A NEED TO KNOW BASIS; U.S. patent application Ser. No. 09/347,034 entitled INTEGRATING SERVICE MANAGERS INTO A ROUTING INFRASTRUCTURE USING FORWARDING AGENTS; U.S. patent application Ser. No. 09/347,048 entitled SYNCHRONIZING SERVICE INSTRUCTIONS AMONG FORWARDING AGENTS USING A SERVICE MANAGER; U.S. patent application Ser. No. 09/347,125 entitled BACKUP SERVICE MANAGERS FOR PROVIDING RELIABLE NETWORK SERVICES IN A DISTRIBUTED ENVIRONMENT; U.S. patent application Ser. No. 09/347,123 entitled STATEFUL FAILOVER OF SERVICE MANAGERS; U.S. patent application Ser. No. 09/347,109 entitled NETWORK ADDRESS TRANSLATION USING A FORWARDING AGENT; and U.S. patent application Ser. No. 09/347,036 entitled PROXYING AND UNPROXYING A CONNECTION USING A FORWARDING AGENT, all filed on Jul. 2, 1999 and incorporated herein by reference for all purposes.

FIELD OF THE INVENTION

The present invention relates generally to providing network services such as load balancing, packet filtering, or Network Address Translation (NAT). Network services are provided using service managers that are integrated into a routing infrastructure.

BACKGROUND OF THE INVENTION

As the IP protocol has continued to be in widespread use, a plethora of network service appliances have evolved for the purpose of providing certain network services not included in the protocol and therefore not provided by standard IP routers. Such services include NAT, statistics gathering, load balancing, proxying, intrusion detection, and numerous other security services. In general, such service appliances must be inserted in a network at a physical location where the appliance will intercept all flows of interest for the purpose of making its service available.

FIG. 1 is a block diagram illustrating a prior art system for providing a network service. A group of clients 101, 102, and 103 are connected by a network 110 to a group of servers 121, 122, 123, and 124. A network service appliance 130 is physically located in the path between the clients and the servers. Network service appliance 130 provides a service by filtering packets, sending packets to specific destinations, or, in some cases, modifying the contents of packets. An example of such modification would be modifying the packet header by changing the source or destination IP address and the source or destination port number.

Network service appliance 130 provides a network service such as load balancing, caching, or security services. In providing security services, network service appliance 130 may function as a proxy, a firewall, or an intrusion detection device. For purposes of this specification, a network service appliance that acts as a load balancer will be described in detail. It should be noted that the architecture and methods described are equally applicable to a network service appliance that is functioning as one of the other above described devices.

Network service appliance 130 is physically located between the group of servers and the clients that they serve. There are several disadvantages to this arrangement. First, it is difficult to add additional network service appliances when the first network service appliance becomes overloaded because the physical connections of the network must be rerouted. Likewise, it is difficult to replace the network service appliance with a back up network service appliance when it fails. Since all packets pass through the network service appliance on the way to the servers, the failure of the network service appliance may prevent any packets from reaching the servers and any packets from being sent by the servers. Such a single point of failure is undesirable. Furthermore, as networks and internetworks have become increasingly complex, multiple services may be required for a single network and inserting a large number of network service appliances into a network in places where they can intercept all relevant packet flows may be impractical.

The servers may also be referred to as hosts and the group of servers may also be referred to as a cluster of hosts. If the group of servers has a common IP address, that IP address may be referred to as a virtual IP address (VIPA) or a cluster address. Also, it should be noted that the terms client and server are used herein in a general sense to refer to devices that generally request information or services (clients) and devices that generally provide services or information (servers). In each example given it should be noted that the roles of client and server may be reversed if desired for a particular application.

A system that addresses the scalability issues that are faced by network service appliances (load balancers, firewalls, etc.) is needed. It would be useful to distribute functions that are traditionally performed by a single network element and so that as much function as possible can be performed by multiple network elements. A method of coordinating work between the distributed functions with a minimum of overhead is needed.

Although network service appliances have facilitated the development of scalable server architectures, the problem of scaling network service appliances themselves and distributing their functionality across multiple platforms has been largely ignored. Network service appliances traditionally have been implemented on a single platform that must be physically located at a specific point in the network for its service to be provided.

For example, clustering of servers has been practiced in this manner. Clustering has achieved scalability for servers. Traditional multiprocessor systems have relatively low scalability limits due to contention for shared memory and I/O.

Clustered machines, on the other hand, can scale farther in that the workload for any particular user is bound to a particular machine and far less sharing is needed. Clustering has also facilitated non-disruptive growth. When workloads grow beyond the capacity of a single machine, the traditional approach is to replace it with a larger machine or, if possible, add additional processors within the machine. In either case, this requires downtime for the entire machine. With clustering, machines can be added to the cluster without disrupting work that is executing on the other machines. When the new machine comes online, new work can start to migrate to that machine, thus reducing the load on the pre-existing machines.

Clustering has also provided load balancing among servers. Spreading users across multiple independent systems can result in wasted capacity on some systems while others are overloaded. By employing load balancing within a cluster of systems the users are spread to available systems based on the load on each system. Clustering also-has been used to enable systems to be continuously available. Individual application instances or machines can fail (or be taken down for maintenance) without shutting down service to end-users. Users on the failed system reconnect and should not be aware that they are using an alternate image. Users on the other systems are completely unaffected except for the additional load caused by services provided to some portion of the users that were formerly on the failed system.

In order to take full advantage of these features, the network access must likewise be scalable and highly available. Network service appliances (load-balancing appliances being one such example) must be able to function without introducing their own scaling limitations that would restrict the throughput of the cluster. A new method of providing network services using a distributed architecture is needed to achieve this.

Network services such as load balancing, packet filtering, or Network Address Translation (NAT) are traditionally performed by single boxes that must be installed directly in the data path of the packets that are being processed. This limits the scalability of the service to the capacity of a single box that is inserted in the data stream. If multiple service managers are required to handle a large load, then partitioning of the work is done by the client population. For example, if multiple parallel firewalls are needed to protect a site, then clients must be individually configured to use a firewall or must somehow be assigned to a certain firewall when needed. What is needed is an architecture that allows multiple network service appliances to be configured in parallel to provide network services. Ideally, service appliances could partition a client population among themselves and repartition the population as needed given changing load conditions. Removing control from the clients would create a more stable, controllable, and predictable network environment.

SUMMARY OF THE INVENTION

A system that includes a plurality of service managers that provide network services through forwarding agents implemented on routers is disclosed. Service managers are partitioned among various clients by configuring the servers to process packets from certain clients. Service managers intercept packets and perform various actions on the packets by using a set of forwarding agents that send packets to the service managers and receive instructions from the service managers that enable the forwarding agents to perform various functions without having the logic required to determine the necessary actions. A plurality of service managers send packet forwarding requests to the same set of forwarding agents. All packets transferring through the forwarding agents may be partitioned among the service managers for determination of appropriate actions and instructions for the forwarding agents.

It should be appreciated that the present invention can be implemented in numerous ways, including as a process, an apparatus, a system, a device, a method, or a computer readable medium such as a computer readable storage medium or a computer network wherein program instructions are sent over optical or electronic communication lines. Several inventive embodiments of the present invention are described below.

In one embodiment, a method of partitioning a network service among a plurality of service managers includes configuring a first service manager to send a first request to a forwarding agent for packets meeting a first criteria and sending the first request to the forwarding agent. A second service manager is configured to send requests to the forwarding agent for packets meeting a second criteria and the second request is sent to the forwarding agent. Packets are checked at the forwarding agent to determine whether the packets meet the first criteria or the second criteria and packets that meet the first criteria are received at the first service manager; and packets that meet the second criteria are received at the second service manager.

In another embodiment, a service manager is configured to send a wildcard affinity update packet to a forwarding agent. The wildcard affinity update packet includes a wildcard affinity that includes a specification of a set of source IP addresses, a specification of a set of destination IP addresses, and a time to live and instructions that indicate that a packet matching the wildcard affinity is to be sent to the service manager.

In another embodiment, a forwarding agent includes a service manager receiving interface configured to receive a plurality of requests from a plurality of service managers for packets meeting a plurality of criteria and a network interface configured to receive packets from devices on a network. A processor is configured to check the packets to determine whether the packets meet one of the plurality of criteria and a service manager sending interface is configured to send packets that meet one of the plurality of criteria to one of the plurality of service managers that corresponds to the one of the plurality of criteria.

In another embodiment, a method of handling packets includes receiving a plurality of requests from a plurality of service managers for packets meeting a plurality of criteria and receiving packets from devices on a network. The packets are checked to determine whether the packets meet one of the plurality of criteria and packets that meet one of the plurality of criteria are sent to one of the plurality of service managers that corresponds to the one of the plurality of criteria.

These and other features and advantages of the present invention will be presented in more detail in the following specification of the invention and the accompanying figures which illustrate by way of example the principles of the invention.

BRIEF DESCRIPTION OF THE DRAWINGS

The present invention will be readily understood by the following detailed description in conjunction with the accompanying drawings, wherein like reference numerals designate like structural elements, and in which:

FIG. 13A is a diagram illustrating the designations for an inbound wildcard, a dispatched outbound wildcard, and a directed outbound wildcard.

FIG. 13B is a diagram illustrating in general how the client IP address and mask, the server IP address and mask, the client port and the server port are mapped to source and destination IP addresses, masks and ports.

DETAILED DESCRIPTION

A detailed description of a preferred embodiment of the invention is provided below. While the invention is described in conjunction with that preferred embodiment, it should be understood that the invention is not limited to any one embodiment. On the contrary, the scope of the invention is limited only by the appended claims and the invention encompasses numerous alternatives, modifications and equivalents. For the purpose of example, numerous specific details are set forth in the following description in order to provide a thorough understanding of the present invention. The present invention may be practiced according to the claims without some or all of these specific details. For the purpose of clarity, technical material that is known in the technical fields related to the invention has not been described in detail in order not to unnecessarily obscure the present invention.

Figure 1:
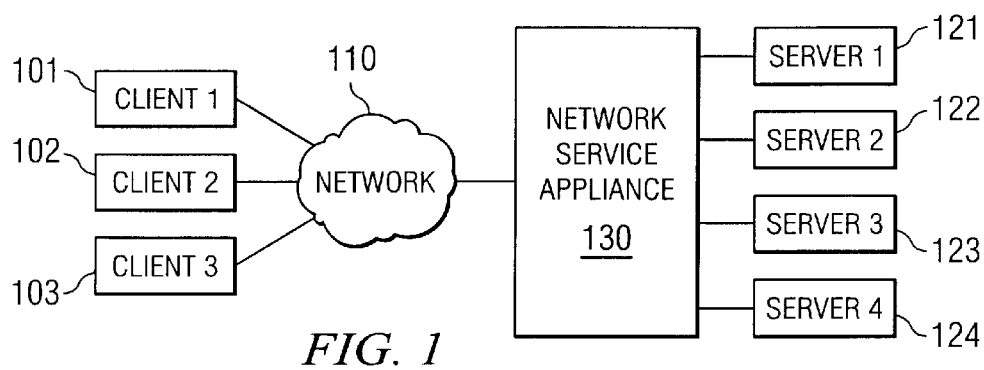
FIG. 1 is a block diagram illustrating a prior art system for providing a network service.
Figure 2A:
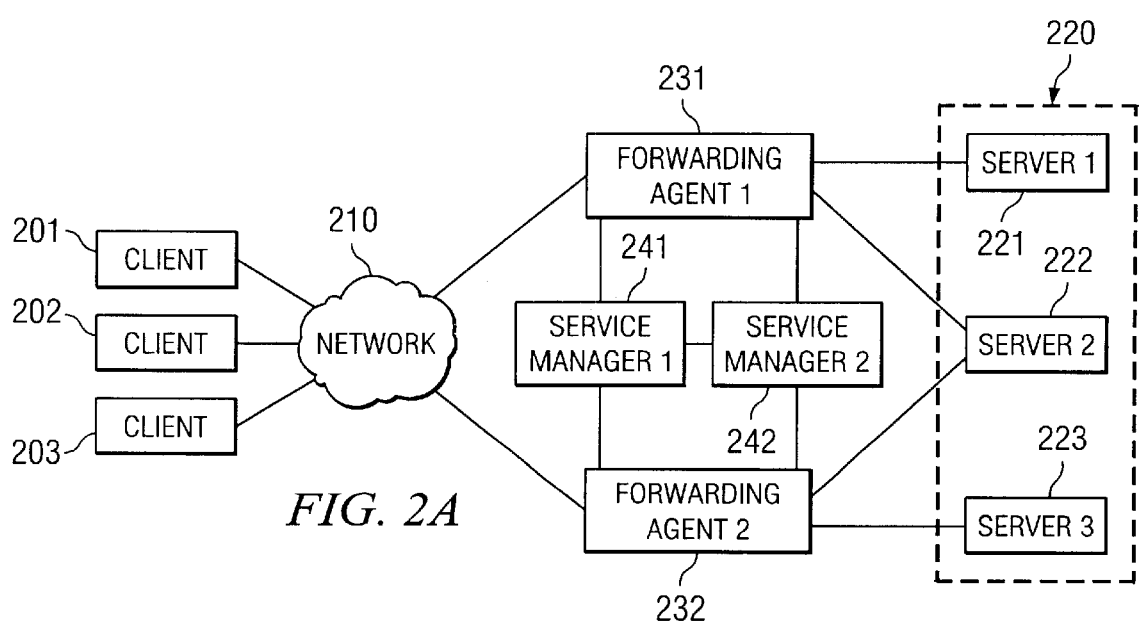
FIG. 2A is a block diagram of a network architecture that provides network services without requiring a network service appliance to be physically placed at a node through which all incoming and outgoing packets processed by a group of servers must pass.

FIG. 2A is a block diagram of a network architecture that provides network services without requiring a network service appliance to be physically placed at a node through which all incoming and outgoing packets processed by a group of servers must pass. Several clients 201, 202, and 203 are connected to a network 210. Network 210 is connected to a group of servers 220 that includes servers 221, 222, and 223. There is no point through which all traffic between devices connected to network 210 and the group of servers 220 must pass. Instead, some traffic from network 210 that is bound for the group of servers passes through a forwarding agent 231 and some traffic between network 210 and group of servers 220 passes though a forwarding agent 232.

In the example shown, forwarding agent 231 is connected to server 221 and server 222 and forwarding agent 232 is connected to server 222 and server 223. Thus, server 222 may communicate with network 210 through either of the forwarding agents, server 221 communicates with network 210 exclusively through forwarding agent 231, and server 223 communicates with network 210 exclusively through forwarding agent 232. This arrangement may be generalized to include an arbitrary number of servers connected to an arbitrary number of forwarding agents with individual servers connected to arbitrary subsets of the forwarding agents.

A service manager 241 and a second service manager 242 also communicate with the forwarding agents. The service managers provide the decision making capability that is required to provide a network service such as load balancing. The service managers send specific instructions to each of the forwarding agents detailing how certain flows of packets are to be processed. Such packet processing may include simply routing the packet, gathering statistics about the packet, sending the packet to a service manager, sending a notification that the packet has been seen to a service manager, modifying the packet, or using a special method such as tunneling or tag switching to send the packet to a destination other than the destination specified by the destination IP address included in the packet header. It should also be noted that forwarding agents in other embodiments also modify other aspects of packets, including packet source and destination addresses and port numbers and, in some instances, packet data.

The service managers communicate with the forwarding agents to give the agents instructions relating to how to handle packets for various flows that are routed through the forwarding agents. It is useful at this point to review certain terminology used herein relating to connections and flows.

As used in this specification, a connection consists of a set of flows. A flow is a set of related packets sent between two end stations. A flow may be identified with layer 3 and layer 4 parameters, depending on the protocol being used. For example, for TCP and UDP, a flow is identified by five parameters: the source and destination IP addresses and port numbers and the protocol. For ICMP, flows are defined by three parameters: the source and destination IP addresses and the protocol.

TCP connections will be described in detail in this specification. It should be appreciated that the techniques disclosed apply to other types of connections as well. TCP connections are defined by a 5-tuple that includes the source and destination IP addresses, the source and destination port numbers, and an identification of the protocol that applies to the packet. The source and destination IP addresses and ports for packets going in one direction between the devices are reversed for packets going in the opposite direction. That is, when the direction that a packet is travelling is reversed, the source becomes the destination and the destination becomes the source. Packets flowing in one direction of a connection are in the same flow.

A connection transfers data between applications on two machines having IP addresses and the applications correspond to port numbers. If the protocol is set by convention to be a certain protocol such as TCP, then a protocol identifier may not be required. The 4 remaining numbers, the source and destination IP addresses, and the source and destination port numbers, are sometimes referred to as a quad. In this specification, the 5-tuple that includes the source and destination IP addresses, the source and destination port numbers and a protocol identification will be referred to as an affinity key. Each unique affinity key thus defines a flow in one direction of a connection. If the source and destination IP addresses and port numbers are reversed for a single affinity key, then it becomes an affinity key that corresponds to a flow in the opposite direction for the same connection. In general, a flow may be identified by a source IP address and destination IP address, by a source IP address, destination IP address and protocol, by a quad, by an affinity key 5-tuple, by only a source and destination IP address or by other information available in a packet header. The term, "flow identifier" is intended to refer to any such method of identifying a flow.

Affinity keys are used by the service managers to identify flows passing through forwarding agents which are to be handled by the forwarding agents in a certain manner. Forwarding agents can accomplish their required tasks with only limited processing capability. Forwarding agents need not determine how to handle certain flows or make decisions such as load balancing or security decisions relating to the flows. The service manager performs those functions and forwards specific instructions to forwarding agents detailing exactly what actions are to be taken for each flow. Instructions for how to handle packets are specified for each flow by the service managers using an affinity key. A specific affinity key that is sent to a forwarding agent together with instructions detailing how packets for flows specified by the affinity key are to be handled is referred to as a fixed affinity.

In addition to specifying instructions for each flow, service managers must also obtain information about each new flow from the forwarding agents. For example, when a service manager provides load balancing through a set of forwarding agents, the service manager uses fixed affinities to provide specific instructions to the forwarding agents detailing where packets for each load balanced flow are to be forwarded. In addition to providing those specific instructions, the service manager also provides general instructions to each forwarding agent that specify which new flows the service manager is interested in seeing. These general instructions are provided using wildcard affinities. Wildcard affinities, which are described in detail below, specify sets of flows that are of interest to a service manager. In one embodiment, this is done by specifying subnet masks that determine sets of source and destination IP addresses that will be forwarded to a service manager. In addition, ports or sets of ports and protocol may be specified in wildcard affinity as well. As is described further below, the use of wildcard affinities enables separate service managers to be configured to provide services for different sets of flows. Each service manager specifies the flows of interest to it and other service managers handle other flows. In this manner, service managers can be configured in parallel to share load.

Thus, service managers use wildcard affinities to specify flows for which they may be providing service and forwarding agents transfer packets for new flows to the appropriate service manager. Once a service manager determines how a certain flow is to be handled, the service manager sends a fixed affinity to each forwarding agent. The fixed affinity overrides the wildcard affinity stored in the forwarding agent that instructs the forwarding agent to forward packets to the service manager with specific instructions for the specific flow specified by an affinity key in the fixed affinity.

In the case of load balancing, service managers send wildcard affinities to forwarding agents. The wildcard affinities specify destination IP addresses that correspond to virtual IP addresses of server clusters that are to be load balanced by the service manager. The forwarding agents then forward new packets sent to those virtual IP addresses to the appropriate service manager. The service manager selects a server from the server cluster and then the service manager sends a fixed affinity to each forwarding agent that instructs the forwarding agent to forward packets for that specific flow to the selected server in the cluster. Forwarding agents may also forward packets for purposes other than load balancing. Packets may be forwarded to real IP addressees as well as virtual IP addresses.

In one embodiment, each forwarding agent is implemented on a router. In other embodiments, forwarding agents may be implemented on switches or other network devices and may be implemented on a coprocessor in a device that also performs another network function. When implemented on a router, the power of this architecture becomes clear. By infusing each router with a limited functionality provided by the forwarding agent, the service managers are able to provide network services without physically being inserted at the various points in the network where those services must be provided. The physical presence of each of the routers at those points is sufficient to enable network services to be provided. This contradicts the conventional wisdom regarding the restriction that all traffic inbound for a server cluster must pass through a single load-balancing engine. The combination of fast forwarding agents (be they 'routers' or IP-aware 'switches') and service managers (to provide synchronization and control) eliminates the scalability limitations of the past.

This specification will refer in detail to forwarding agents implemented on routers for the purpose of example. It should be remembered that forwarding agents may also be implemented on other devices and that the same or similar advantages may be realized.

The service managers send wildcard affinities to each of the forwarding agents that direct the forwarding agents to process packets that match the wildcard affinities in a certain manner. For example, a service manager may request to be notified when certain packets are received by the routers that include the forwarding agents. When a packet that matches such an instruction is received, the forwarding agent notifies the service manager and the service manager determines what to do with that packet and future packets for the flow based on the network service being provided. Instructions are then sent from the service manager to the forwarding agent at the router that allow the router to process the packets in accordance with the decisions made by the service manager.

In addition to specifying that a service manager is to be notified upon receipt of a certain type of packet, wildcard affinities may also specify other actions to be taken. For example, a wildcard may specify an IP address to which packets are to be forwarded without notification to the service manager. Packets may also be copied to a service manager or other device and packets may also be denied or dropped.

It should be noted that the service managers also may be connected to one or more of the servers and may in some cases forward packets received from forwarding agents or received from the network directly to certain servers. However, it is significant that the service managers need not be connected to servers for which they are managing packet traffic. The service manager may accomplish all packet routing through forwarding agents by sending instructions to forwarding agents. It should also be noted that the service managers may also be connected to each other for the purpose of coordinating their instructions or providing backup services.

Figure 2B:
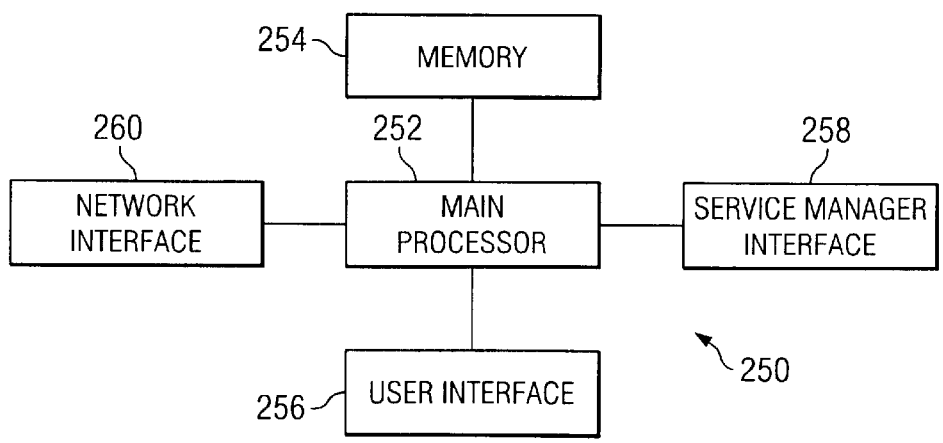
FIG. 2B is a block diagram illustrating an architecture for a forwarding agent.

FIG. 2B is a block diagram illustrating an architecture for a forwarding agent. Forwarding agent 250 includes a main processor 252 and a memory 254. Memory 254 may include RAM, ROM, nonvolatile memory such as an EPROM, or a disk drive. Forwarding agent 250 also includes a user interface 256 that allows a user to configure the forwarding agent or monitor the operation of the forwarding agent.

Forwarding agent 250 also includes a service manager interface 258 that allows packets to be sent to and received from a service manager. In addition, the service manager interface allows service managers to send fixed and wildcard affinities to the forwarding agent. In one embodiment, a separate interface is used for the purpose of sending wildcard affinities to forwarding agents using multicast. In other embodiments, a single interface may be provided between the service manger and the forwarding agent. The forwarding agent also includes a network interface 260 that is used to send and receive packets to and from other devices on the network.

It should be noted that the network interface and the service manager interface may be the same interface in certain embodiments. In such embodiments, all communication between the forwarding agent and the service manager is carried on the same network as packets processed by the forwarding agent.

A forwarding agent may be implemented on various network devices. A forwarding agent may be implemented on a network device dedicated to acting as a forwarding agent but the true power of the system is realized when forwarding agents are implemented on network devices that already are included in a network for some other purpose. Forwarding agents may be implemented on routers that already exist at strategic points in a network for intercepting packets and providing a service using a forwarding agent.

Figure 2C:
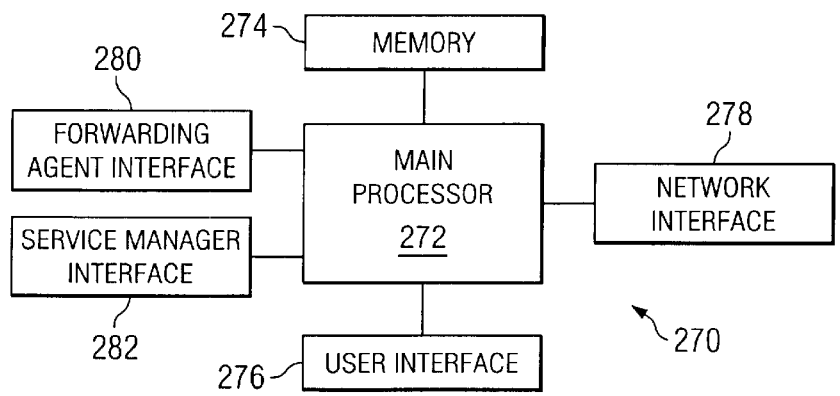
FIG. 2C is a block diagram illustrating an architecture for a service manager.

FIG. 2C is a block diagram illustrating an architecture for a service manager. Service manager 270 includes a main processor 272 and a memory 274. Memory 274 may include RAM, ROM, nonvolatile memory such as an EEPROM or a disk drive. Service manager 270 also includes a user interface 276 for the purpose of allowing a user to configure the service manager or monitor the operation of the service manager.

Service manager 270 also optionally includes a network interface 278. Network interface 278 allows the service manager to directly forward packets into the network for which it is providing a service. If no network interface is provided, then the service manager can still forward packets by sending them to a forwarding agent.

A forwarding agent interface 280 is included on the service manager for the purpose of allowing the service manager to send packets and affinities to forwarding agents. Forwarding agent interface 280 may include more than one interface. For example, in one embodiment, a separate interface is used for multicasting wildcard affinities to all forwarding agents and a separate interface is used for the purpose of unicasting fixed affinities to individual forwarding agents and forwarding packets to individual forwarding agents.

Service manager 270 may also include a service manager interface 282 used to communicate with other service managers. The service manager may communicate with other service managers for the purpose of providing a fail over scheme of backup service managers. Operational status of service managers may be communicated on the service manager interface and a master service manager may send configuration information about flows being supported through backup service managers so that the backup service managers can function in place of the master service manager should it fail.

A service manager may be implemented on a standard microcomputer or minicomputer. In one embodiment a service manager is implemented on a UNIX workstation. A Service manager may also be implemented on other platforms including Windows, an embedded system or as a system on a chip architecture. A service manager also may be implemented on a router.

One network service that can be readily provided using the architecture described in FIG. 2A is load balancing connections among a set of real machines that are used to service connections made to a virtual machine. The real machines may also be referred to as hosts and the virtual machine may also be referred to as a cluster of hosts. The following figures describe how a service manager directs forwarding agents to intercept packets for new connections and send them to the service manager. The service manager then selects a real machine to handle each connection, and directs one or more forwarding agents to forward packets to the selected real machine. Forwarding agents may forward packets using NAT or may use another method of sending packets to the selected real machine.

Figure 3A:
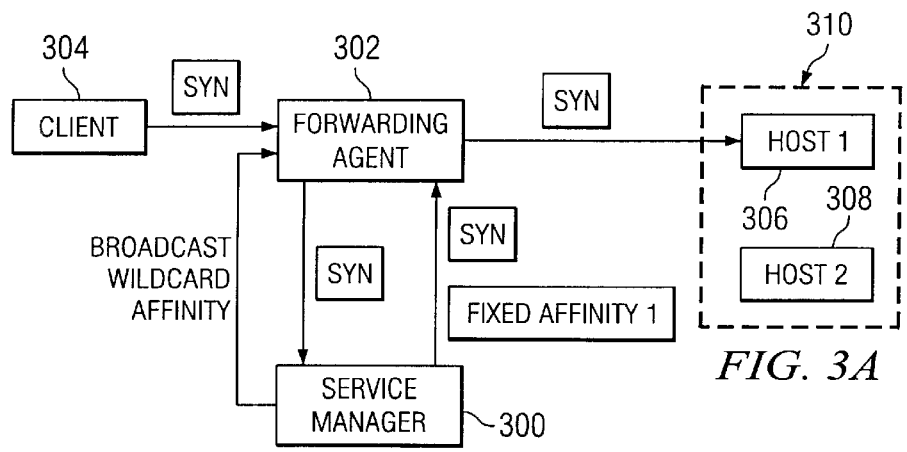
FIG. 3A is a diagram illustrating how a service manager and a forwarding agent cooperate to establish a connection from a client to a selected real machine.

FIG. 3A is a diagram illustrating how a service manager and a forwarding agent cooperate to establish a connection from a client to a selected real machine. A service manager 300 broadcasts or multicasts a wildcard affinity to all forwarding agents that are listening for wildcard affinities sent by service manager 300. In some embodiments, wildcard affinities may be broadcast. A forwarding agent 302 receives the wildcard affinity. In one embodiment, all forwarding agents and service managers register to a common multicast group so that neither service managers nor forwarding agents need to have any preknowledge of the existence of each other. Thus, a service manager registers its interests with the forwarding agents by multicasting wildcard affinities to the multicast group. Each wildcard affinity provides a filter which recognizes general classes of packets that are of interest.

As an example, client 304 may wish to establish a TCP connection with a virtual machine having a virtual IP address. It should be noted that other types of connections may also be established. To establish the TCP connection, client 304 sends a SYN packet with a destination address corresponding to the virtual IP address. The SYN packet is received by forwarding agent 302. Forwarding agent 302 determines that the destination address of the SYN packet matches the wildcard affinity broadcast by service manager 300. The action included in the broadcast wildcard affinity specifies that all packets matching the wildcard affinity are to be forwarded to the service manager. Therefore, forwarding agent 302 forwards the SYN packet to service manager 300.

Service manager 300 receives the SYN packet from the forwarding agent. It should be noted that, in one embodiment, forwarding agent 302 encapsulates the SYN packet in a special system packet when the SYN packet is sent to the service manager. Service manager 300 receives the SYN packet and processes the packet according to whatever service or services are being provided by the service manager. In the example shown, service manager 300 is providing load balancing between a first host 306 and a second host 308. Together, host 306 and host 308 comprise a virtual machine that services the virtual IP address that is the destination of the SYN packet sent by client 304. Service manager 300 determines the host that is to receive the SYN packet and that is to handle the connection initiated by the SYN packet. This information is included in a fixed affinity. The SYN packet is encapsulated with the fixed affinity and sent back to forwarding agent 302.

The fixed affinity sent to the forwarding agent 302 may include an action that directs the forwarding agent to dispatch the SYN packet directly to host 306. The action included in the fixed affinity may also direct the forwarding agent to translate the destination address of the packet to the IP address of host 306 and the packet may be routed to host 306 via one or more hops. In addition, as described below, tag switching may also be used to send the packet to the host that is selected by the service manager using its load balancing algorithm.

Thus, the SYN packet is directed to the host selected by service manager 300 without service manager 300 being inserted into the path of the packet between the hosts which comprise virtual machine 310 and client 304. The service manager broadcasts a wildcard affinity to all forwarding agents potentially in that path and the forwarding agents forward SYN packets to the service manager whenever a client establishes a new connection. The service manager then returns the SYN packet with a fixed affinity that directs the forwarding agent how to forward that SYN packet as well as future packets sent in the flow from the client to the virtual machine. The forwarding agent then sends the SYN packet on to the selected host using network address translation (NAT), tag switching, or some other method.

Figure 3B:
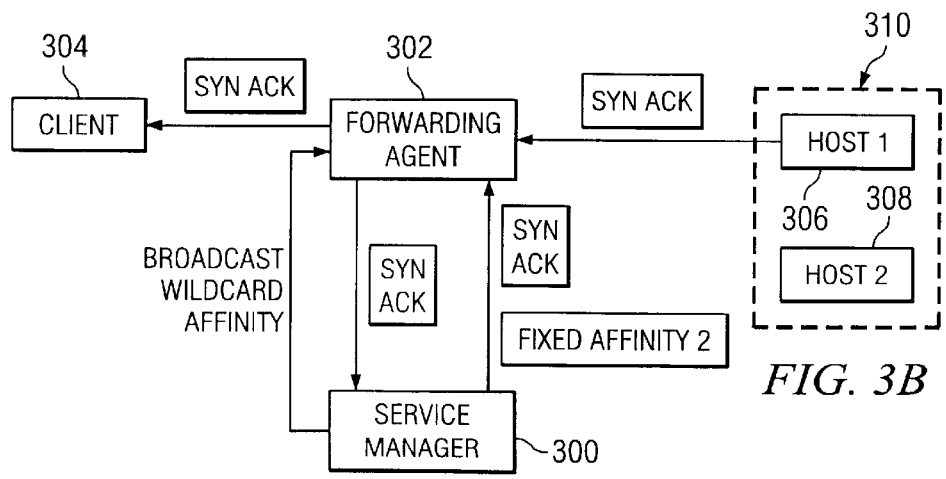
FIG. 3B is a diagram illustrating how a forwarding agent routes a SYN ACK returned from a host back to a client.

FIG. 3B is a diagram illustrating how a forwarding agent routes a SYN ACK returned from a host back to a client. A service manager 300 broadcasts a wildcard affinity to a forwarding agent 302. The wildcard affinity matches packets with a source IP address matching either host 306 or host 308 which implement virtual machine 300. When host 306 sends a SYN ACK packet back to client 304, the SYN ACK travels through forwarding agent 302. Because of the wildcard affinity that matches the source IP address of host 306, forwarding agent 302 encapsulates the SYN ACK packet and sends it to service manager 300. Service manager 300 then identifies the SYN ACK as the SYN ACK corresponding to the SYN that was sent by the client shown in FIG. 3A and sends the SYN ACK together with a fixed affinity to forwarding agent 302. The fixed affinity may include an action that directs the forwarding agent to replace the source IP address of host 306 with the virtual IP address of virtual machine 310 before forwarding the SYN ACK packet on to client 304.

Thus, FIGS. 3A and 3B show how a forwarding agent intercepts a SYN packet from a client and translates the destination IP address from the destination IP address of a virtual machine to the destination IP address of a specific host. The specific host is determined by the service manager using a load balancing algorithm. The forwarding agent does not include logic that performs load balancing to determine the best host. The forwarding agent only needs to check whether the incoming SYN packet matches a fixed affinity or a wildcard affinity broadcast to the forwarding agent by the service manager.

The SYN packet is forwarded to the service manager and the service manager returns the SYN packet to the forwarding agent along with a fixed affinity that includes an action which specifies how the forwarding agent is to handle the SYN packet. When a SYN ACK is returned by the host, the forwarding agent again finds a wildcard affinity match and forwards the SYN ACK packet to the service manager. The service manager returns the SYN ACK packet to the forwarding agent along with a second fixed affinity that instructs the forwarding agent how to handle packets in the flow back from the host the client.

The first fixed affinity from the service manager includes an affinity key that corresponds to the flow from the client to the host and the second fixed affinity sent form the service manager to the forwarding agent contains an affinity key that corresponds to the flow from the host back to the client. Future packets in either flow sent from the client or the host match the affinity key in one of the fixed affinities and are handled by the forwarding agent according to the action contained in the fixed affinity. It is no longer necessary to forward such packets to the service manager. In some applications, the forwarding agent may continue to forward data about the packets to the service manager so that the service manager can monitor connections or maintain statistics about network traffic.

Figure 3C:
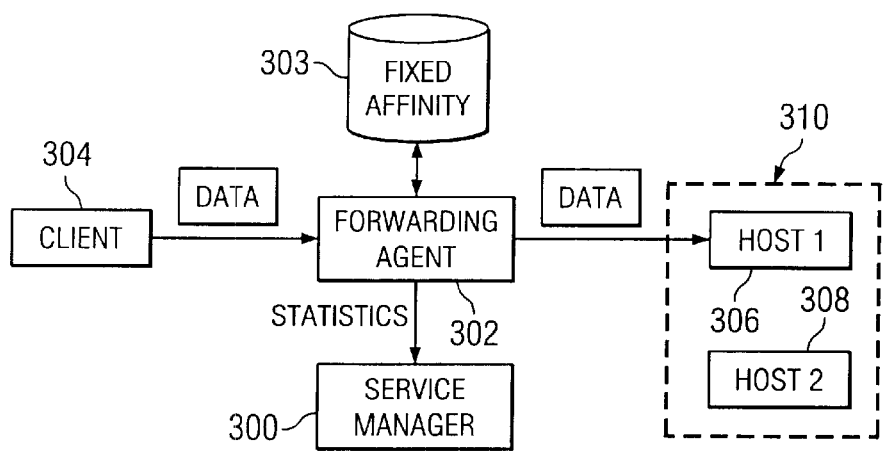
FIG. 3C is a diagram illustrating how a subsequent data packet from client 304 is routed by forwarding agent 302 to host 306.

FIG. 3C is a diagram illustrating how a subsequent data packet from client 304 is routed by forwarding agent 302 to host 306. Client 304 sends a data packet to forwarding agent 302. Forwarding agent 302 has stored the fixed affinity corresponding to the flow from the client to the host in a fixed affinity database 303. Forwarding agent 302 notes the match of the 5-tuple of the data packet with an affinity key in the fixed affinity database and then forwards the data packet according to the action defined in that fixed affinity. In this example, the action defined is to translate the destination IP address of the client from the virtual IP address of virtual machine 310 to the IP address of host 306. In addition to forwarding the data packet, the affinity found by the forwarding agent also includes an action that requires the forwarding agent to send an affinity packet to service manager 300 that includes data about the packet for the purpose of service manager 300 gathering statistics about network traffic.

The examples shown in FIG. 3A through FIG. 3C illustrate how the first packet sent in both flows of a new connection are forwarded to the service manager by the forwarding agent. The service manager then directs the forwarding agent to handle the packets in a certain manner by sending fixed affinities to the forwarding agent for each flow and specifying actions to be performed on the packets. In the example shown, the action involves translating the destination IP address from the client to a specific host IP address and translating the source IP address in packets form the host to a virtual IP address. Other actions may be defined by fixed affinities including translating other IP addresses, translating port numbers or dispatching packets to other machines. Some of these other actions are described below.

Figure 4:
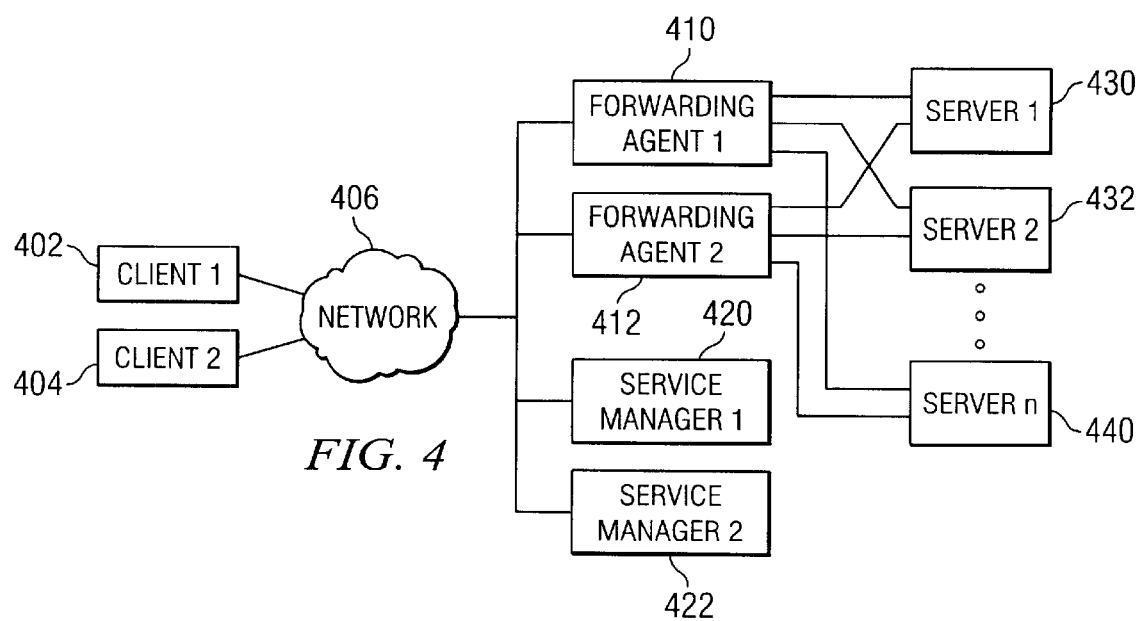
FIG. 4 is a diagram illustrating a network that includes two forwarding agents and two service managers.

FIG. 4.is a diagram illustrating a network that includes two forwarding agents and two service managers. A first client 402 and a second client 404 send packets through a network or internetwork 406 that eventually reach a subnetwork that includes a first forwarding agent 410, a second forwarding agent 412, a first service manager 420, and a second service manager 422. In the examples shown, the service managers communicate with the forwarding agents and with each other over the same physical network that is used to send packets. In other embodiments, a separate physical connection may be provided between service managers for the purpose of coordinating service managers and providing back up service managers and a separate connection may be provided between the service managers and the forwarding agents for the purpose of multicasting wildcard affinities or, in some embodiments, for sending fixed affinities and returning packets to forwarding agents.

In general, the service managers may communicate amongst themselves and with the forwarding agents in any manner appropriate for a particular system. The forwarding agents each are connected to a first server 430, a second server 432 and other servers up to an nth server 440. These servers may represent one or more virtual machines. Packets from the clients may be routed through either forwarding agent 410 or forwarding agent 412. In fact, packets corresponding to the same connection or flow may be routed at different times through different forwarding agents. To cope with this situation, the service managers multicast wildcard affinities to both forwarding agents. When either forwarding agent first receives a packet for a flow, that forwarding agent forwards the packet to the manager that has requested the packet using a wildcard affinity so that the service manager can provide the forwarding agent with the fixed affinity that defines how to handle the packet.

Figure 5:
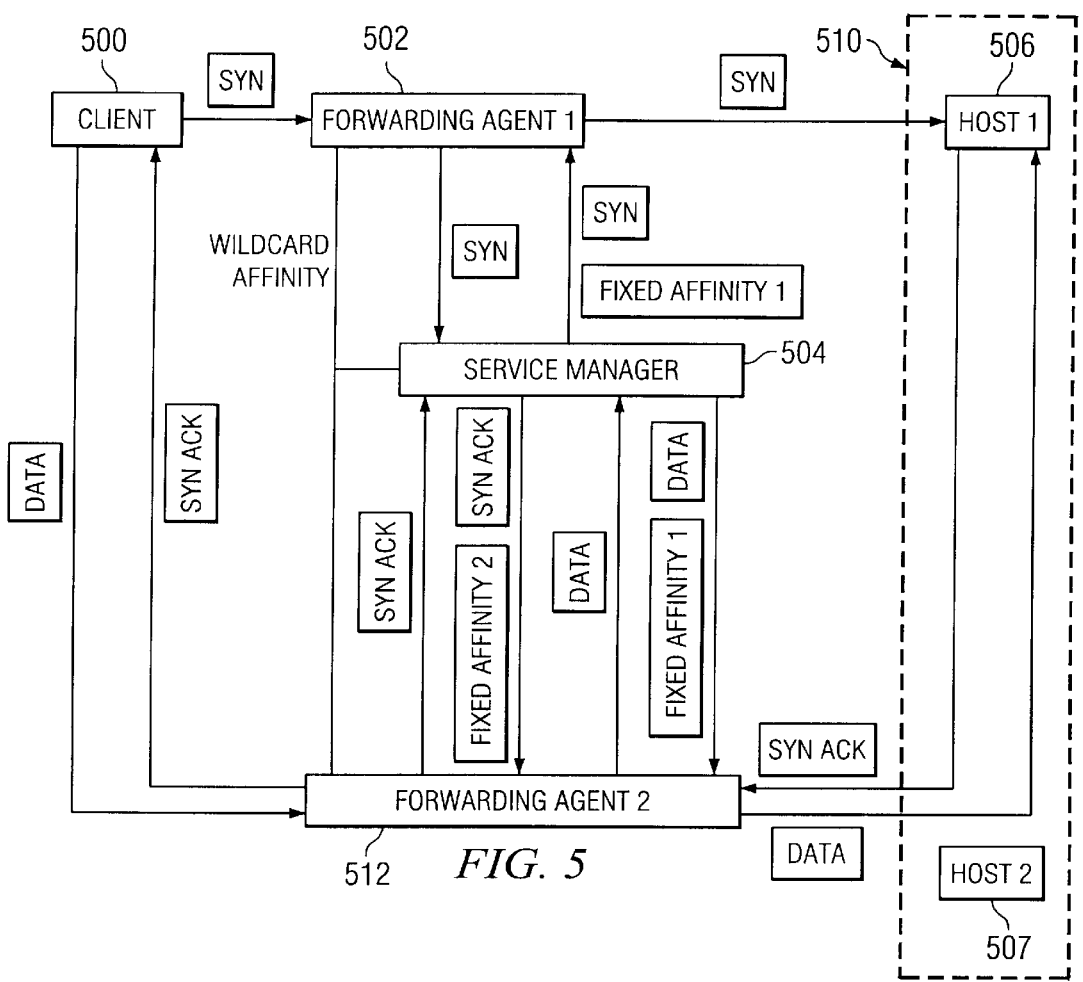
FIG. 5 is a diagram illustrating how a service manager provides instructions to two separate forwarding agents for handling a connection.

FIG. 5 is a diagram illustrating how a service manager provides instructions to two separate forwarding agents for handling a connection. A client 500 sends a SYN packet to a first forwarding agent 502. Forwarding agent 502 has previously received a wildcard affinity from a service manager 504 on a dedicated connection on which service manager 504 multicasts wildcard affinities to forwarding agents. As a result of the wildcard match, forwarding agent 502 encapsulates the SYN packet and forwards it to service manager 504. Service manager 504 receives the SYN packet and returns it to forwarding agent 502 along with a fixed affinity specifying an action to be performed on the packet. The action defined in this example is translating the destination IP address of the packet from a virtual IP address to the IP address of a host 506. Hosts 506 and 507 together implement a virtual machine 510.

Host 1 receives the SYN packet from forwarding agent 1 and returns a SYN ACK packet back to client 500. However, for some reason, the SYN ACK packet from host 1 is routed not through forwarding agent 502, but instead through forwarding agent 512. Forwarding agent 512 receives the SYN ACK and notes that it matches a wildcard affinity corresponding to the flow of packets from host 506 to client 500. Forwarding agent 512 encapsulates the SYN ACK packet and sends it to service manager 504. Service manager 504 defines an action for the SYN ACK packet and includes that action in a second fixed affinity which it sends along with the encapsulated SYN ACK packet back to forwarding agent 512. Forwarding agent 512 then sends the SYN ACK packet on to client 500 where it is processed.

At this point, forwarding agent 502 has a fixed affinity for the flow from client 500 to the hosts and forwarding agent 512 has a fixed affinity for the flow from the hosts back to client 500. Each forwarding agent continues to handle flows without fixed affinities using the wildcard affinities. The service manager acts as a point of synchronization between the forwarding agents when the forwarding agents handle common flows.

Client 500 then sends a data packet which happens to be routed through forwarding agent 512 and not forwarding agent 502. Forwarding agent 502 has received the fixed affinity that provides instructions on how to deal with packets in the flow from client 500 to virtual machine 510. However, forwarding agent 512 has not yet received that fixed affinity. Forwarding agent 512 has received a wildcard affinity previously multicast by the service manager. Therefore, forwarding agent 512 detects a wildcard affinity match for the data packet and encapsulates the data packet and sends it to service manager 504.

Service manager 504 receives the data packet and notes that the data packet matches the previously defined first fixed affinity which was sent to forwarding agent 502. Service manager therefore does not run the load balancing algorithm again to determine where to route the data packet, but instead returns the first fixed affinity to forwarding agent 512 along with the data packet. Forwarding agent 512 receives the data packet and the fixed affinity and then has the same instructions as forwarding agent 502 for handling that data packet and other packets in the flow from client 500 to virtual machine 510. Forwarding agent 512 therefore translates the destination IP address of the data packet to the IP address of host 506 and forwards the packet on to host 506.

Thus, as long as wildcard affinities are received by each forwarding agent, the service manager is able to provide fixed affinities to each forward agent whenever a fixed affinity is required to provide instructions to handle packets for a given flow. Once a fixed affinity is defined for a flow, the same fixed affinity is provided to any forwarding agent that returns a packet to the service manager as a result of a wildcard match.

To provide a load balancing service for HTTP, a service manager sends a pair of wildcard affinities (one for each direction of flow to and from a virtual machine) to a multicast group that includes each available router in a network. The wildcard affinities specify a protocol and also indicate an exact match on the IP Address and HTTP port number for the virtual machine and an IP address and mask combination that identifies the client population that is serviced by the service manager. The client population serviced by the service manager is referred to as the client domain of the service manager. If multiple service managers are used, then each service manager may be configured to service a different client domain.

For example, if the majority of traffic is coming from a small number of firewalls, whereby the same foreign IP address is shared by many different clients, all those affinities can be assigned by one service manager. Thus, traffic from large sites can be isolated from other traffic and assigned to a different service manager.

Thus, the architecture is scalable and service managers may be added to handle client domains as needed. The set of clients serviced by each service manager can be changed by canceling the wildcards that each service manager has broadcast to forwarding agents and sending new wildcards specifying the new client domain.

When multiple service managers are included, it is important that the client domains specified by service managers performing the same service do not overlap. The task of assigning affinities for each client domain is centralized by the service manager serving that domain so all packets for a given flow are controlled by a single service manager. For example, if duplicate SYN packets are sent by a client, both should be directed to the same service manager and assigned the same fixed affinity. If the packets were directed to different service managers, then the service manager load balancing algorithms might assign different real machines to handle the connections as a result of the network being in a different state when the second SYN packet arrived. In addition, UDP unicasts from the same client must be assigned the same affinity and related connections (e.g., FTP control and data connections) must be assigned the same affinity.

Once the forwarding agents have received fixed affinities, packets intercepted that match a fixed affinity are processed as instructed in the set of actions specified in the fixed affinity. If a matching fixed affinity is not found, the packet is compared against the wildcard affinities to find manager (s) that are interested in this type of packet. If no appropriate Wildcard Affinity is found, normal IP routing occurs. Generally, a manager uses the wildcard affinity to be informed of flows it may be interested in. Once a manager has determined how a flow should be handled, it usually sends a fixed affinity so that the processing of subsequent packets for that flow can be offloaded to the forwarding agent. In some cases actions for certain flows can be predetermined by the service manager without seeing packets from the flow. In such cases, the actions may be specified in a wildcard affinity and no message need be sent to the service manager and no fixed affinity need be generated. The service manager may specify that it is still to receive certain packet types after a fixed affinity is sent by including an optional action interest criteria message segment with the fixed affinity.

In the load-balancing case, a fixed affinity is used to identify the server that is to receive this particular flow whereas a wildcard affinity is used to define the general class of packets for which load balancing is to be performed (all those matching the cluster address and port number for the clustered service) and to identify the manager that is to make the balancing decision for flows that match the wildcard affinity.

Fixed Affinities

Figure 6:
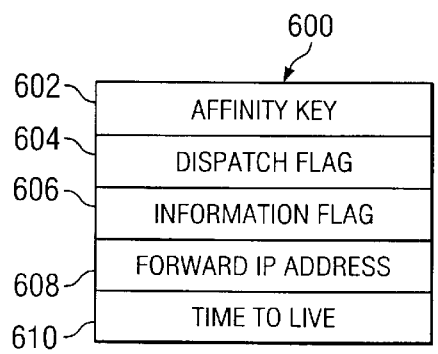
FIG. 6 is a diagram illustrating a fixed affinity.

FIG. 6 is a diagram illustrating a fixed affinity 600. Fixed affinity 600 matches only one flow through a network. As described above, a flow is defined by an affinity key, which is a unique 5-tuple that spans the packet headers:
IP Header:
  Protocol Type (e.g., UDP or TCP)
  Source IP Address
  Destination IP Address
TCP or UDP Header:
  Source Port
  Destination Port It should be noted that if the protocol being used is not TCP or UDP, then the ports in the affinity key may be set to 0.

Fixed affinity 600 includes an affinity key 602. In addition, fixed affinity 600 contains information that dictates how a forwarding agent is to process packets that match the affinity key, and how the forwarding agent is to manage the affinity.

A dispatch flag 604 indicates whether the packet is to be dispatched to the forward IP address included in the fixed affinity. Setting the dispatch flag indicates that the packet is to be forwarded to a forward IP address 608 that is provided in the fixed affinity. The difference between dispatched and directed traffic is that dispatch traffic is forwarded directly from a forwarding agent to a specific server without translating the destination IP address of the packet. In other words, if a packet is dispatched, then the packet destination address is not used to forward the packet. Instead, a forwarding address contained in an affinity is used to forward the packet. If the connection is not dispatched but directed by the forwarding agent, then the packet IP destination must be translated using NAT if the packet is redirected to a specific server.

If forward IP address 608 is zero, then the packet is dropped after processing statistics as indicated by an information flag 606. Not setting the dispatch flag indicates that the packet is to be forwarded based on the address provided in the packet IP header.

Information flag 606 indicates whether or not statistics are to be gathered for packets forwarded using the fixed affinity. If the Information flag is set, statistics are updated for the forward IP address. In one embodiment, the statistics kept include:
  1. total bytes for all packets matching the forward IP address
  2. total packets matching the forward IP address Statistics for packets and bytes matching the affinity may be kept regardless of the setting of the Information flag.

Fixed affinity 600 also includes a time to live 610. Time to live 610 specifies the number of seconds before the fixed affinity should be timed-out from a fixed affinity cache maintained by a forwarding agent. If a time to live of 0 is specified, then that means that the fixed affinity is not to be cached by a forwarding agent and if a copy of the fixed affinity is already in the cache, it should be removed. Thus, service managers may remove fixed affinities that they have sent to forwarding agents by simply sending copies of those fixed affinities to the forwarding agents with time to live set to 0.

Each fixed affinity sent by a service manager is correlated to a wildcard affinity previously sent by the service manager. If a forwarding agent receives a fixed affinity for which no supporting wildcard affinity is found, the forwarding agent ignores the fixed affinity and discards it.

Wildcard Affinities

Figure 7:
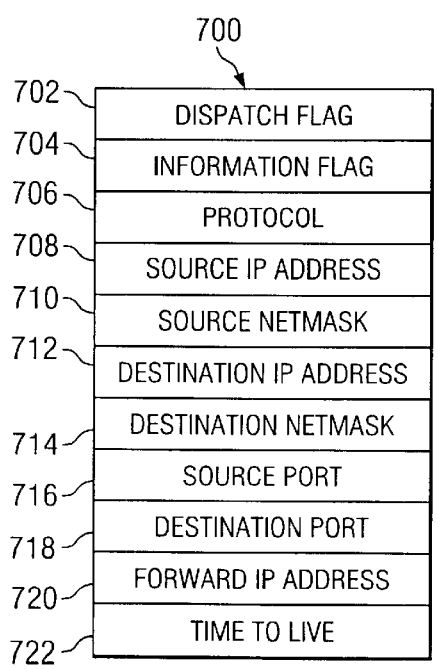
FIG. 7 is a diagram illustrating a wildcard affinity.

FIG. 7 is a diagram illustrating a wildcard affinity 700. Wildcard affinity 700 is a more general form of Affinity that is used by a service manager to register filters with the forwarding agent(s) that define the range of flows that are of interest to the service manager. Like a fixed affinity, wildcard affinity 700 also includes a dispatch flag 702 and an information flag 704. Wildcard affinity 700 also includes the elements of an affinity key (protocol 706, source IP address 708, destination IP address 712, source port 716, and destination port 718) plus source netmask 710 and destination netmask 714.

The netmasks and the source and destination IP addresses are used to specify ranges of addresses covered by the wildcard affinity. The source netmask is ANDed with the source IP address in the wildcard affinity. The source netmask is also ANDed with the source IP address from the packet. If the results of the two operations are equal, then the source IP address of the packet is considered to be in range of the wildcard affinity. Likewise, the destination netmask is ANDed with the destination IP address in the wildcard affinity. The destination netmask is also ANDed with the destination IP address from the packet. If the results of the two operations are equal, then the destination IP address of the packet is considered to be in range of the wildcard affinity. If both the source and the destination IP addresses of the packet are in the range of the wildcard affinity, and the ports and protocols also match, then the packet is said to match the wildcard affinity. It should also be noted that, in one embodiment, a zero specified for a port or a protocol matches all ports or protocols.

It should be noted that in other embodiments, other methods of specifying ranges for the wildcard affinity are used. For example, in one alternative arrangement, ranges of IP addresses are specified by specifying lower bound and upper bound IP addressees. All addresses between the two bounds fall within the range of the wildcard affinity. In some applications, multiple ranges may be specified. The method described above is particularly useful for specifying a single address, specifying all addresses in a subnet, or specifying every even or odd address, every fourth address, every eighth address, etc.

For example, to specify a single host of 1.1.1.1, the wildcard affinity include an IP address of 1.1.1.1 with a netmask of 255.255.255.255. To specify the range of hosts from 1.1.1.0 to 1.1.1.255, the wildcard affinity would include an IP address of 1.1.1.0 with a netmask of 255.255.255.0, indicating that the first three bytes of the IP address must match exactly and that the last byte is to be ignored.

Wildcard affinity 700 also includes a time to live 722. Time to live 772 is used in the same manner as the time to live for the fixed affinity. Wildcard affinities are deleted by forwarding agents based on the time to live set for the wildcard affinity by the service manager. The timing of such a deletion need not be exact. In one embodiment, the timing need only be accurate to within two seconds. This same tolerance is for fixed affinities as well. Service managers must refresh each wildcard affinity before its time to live expires in order to continue to receive packets that match the wildcard affinity from forwarding agents. As with the fixed affinity, a wildcard affinity may be deleted by sending a duplicate wildcard affinity with a time to live of 0.

Actions

Thus, fixed affinities specify individual flows and packets and wildcard affinities specify sets of flows to be processed in a special way. Such processing is defined by associating actions with the affinities. Actions defined for the affinities specify the service to be performed by the forwarding agent on behalf of the Manager. For fixed affinities, services specified may include:

Interest Criteria—a list of packet types that cause a notification to be sent to the service manager.

Sequence Number Adjustment—a set of deltas and initial sequence numbers by which the TCP sequence numbers and ACK numbers are to be adjusted.

NAT—provides details for how Network Address Translation is to be performed.

For Wildcard Affinities, applicable actions are:

Interest Criteria—a list of packet types that cause a notification to be sent to the service manager.

Advertise—indicates that the destination IP Address in the Wildcard Affinity is to be advertised by the forwarding agent. This may be done by including the destination IP address in routing protocol updates.

Sequence Number Adjustment—a set of deltas and initial sequence numbers by which the TCP sequence numbers and ACK numbers are to be adjusted.

NAT—provides details for how Network Address Translation is to be performed.

Forwarding agents may not support all possible actions. For example, some forwarding agents may not support NAT. The set of actions that the service manager expects a forwarding agent to support are identified in an action list which may be included with the wildcard affinity. If the forwarding agent does not support one or more of the actions identified in the list, it discards the wildcard affinity and send a message to the service manager indicating that it does not support all of the actions in the list. This message is referred to as an affinity update deny message. The service manager then may attempt to send a new wildcard affinity that excludes any unsupported actions identified in the affinity update deny message.

Service Messages

Figure 8A:
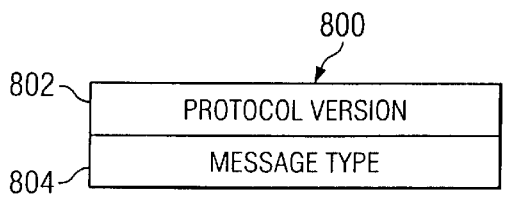
FIG. 8A is a diagram illustrating a service message header.

Wildcard affinities, fixed affinities, actions, packets, and other messages are sent between service managers and forwarding agents encapsulated in service messages. In one embodiment, messages sent between service managers and forwarding agents are sent using the specific service message format described below. Service messages are sent between service managers and forwarding agents using UDP. Wildcard affinities, which are sent by service managers, can be multicast to a multicast IP Address and UDP Port known to the service manager(s) and forwarding agent(s), or can be unicast to a particular forwarding agent or service manager. FIG. 8A is a diagram illustrating a service message header used in one embodiment. Service message header 800 includes a protocol version 802 and a message type 804. The protocol version identifies the version of the service protocol supported by the sender. The message type identifies the overall purpose of this message, the base format for the message, and implies the set of optional message segments that may be included in the message.

The following service message types are used:

| Message Type |
| --- |
| affinity update-wildcard affinity |
| affinity update-fixed affinity |
| affinity update-deny |
| interest match-wildcard affinity |
| interest match-fixed affinity |
| IP packet only |

The affinity update-wildcard affinity message is used to send wildcard affinities from a service manager to forwarding agents. The affinity update-fixed affinity message is used to send fixed affinities. The affinity update-deny message is used to report that an affinity update message has been rejected because required actions included in the affinity update are not supported by the receiver. The interest match-wildcard affinity message is used to report a wildcard affinity match to a service manager and the interest match-fixed affinity message is used to report a fixed affinity match to a service manager. The IP packet only message is used to forward an IP packet.

Figure 8B:
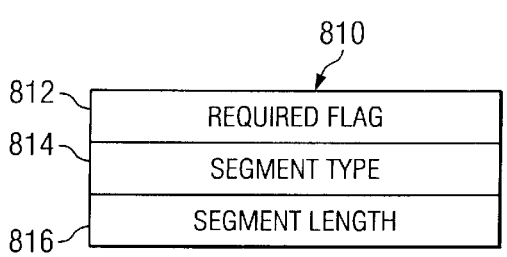
FIG. 8B is a diagram illustrating a segment header.

After the service message header, a service message includes one or more message segments. Each message segment begins with its own segment header. FIG. 8B is a diagram illustrating a segment header. Segment header 810 includes a Required flag 812. Required flag 812 defines whether the sender will allow the rest of the message to be processed even if the segment cannot be processed (either because the receiver does not support the function described by the segment or because the receiver does not understand the segment). The required flag either indicates that the segment may be ignored or that the segment is required. If a required segment cannot be processed, then the entire message that includes the segment is dropped and an error message is returned to the sender. Each segment header is followed by data that is specific to the message segment.

The following message segments are used:

| Segment Name |
| --- |
| Wildcard Affinity |
| Fixed affinity |
| Affinity Interest |
| Service Precedence |
| Security |
| Service Manager Interest Data |
| forwarding agent Interest Data |
| Identity Info |
| Action-NAT |
| Action-Advertise |
| Action-Sequence Number Adjust |
| Action-Interest Criteria |
| Action List |
| IP Packet |

The fixed affinity, wildcard affinity and security segments are described immediately below. The remaining segments are described in detail following a description of the message types that include the segments.

Security

If security is expected by the receiver, a security message segment immediately follows the service message header. The security message segment contains the expected security sequence. If the receiver does not expect security, the security message segment is ignored (if present) and the message is accepted. Security is generally not required for IP packet only messages. If authentication is successful, the signals are accepted. If the authentication fails, the signal is ignored. Various authentication schemes such as MD5 may be supported. The type of authentication to be used is configured at the senders and receivers, along with a password. If the receiver does not expect authenticated messages, then the security segment may be ignored if it is present and the signal may be accepted whether or not it contains a security segment.

Figure 8C:
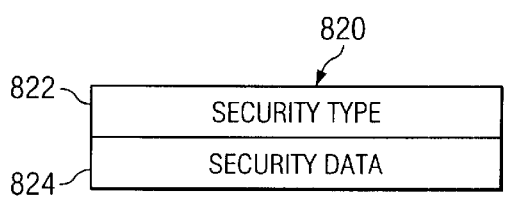
FIG. 8C is a diagram illustrating a security message segment.

FIG. 8C is a diagram illustrating a security message segment. Security message segment 820 includes a security type field and a security data field 824. Security type field 822 describes the type of encoding used for security (i.e., MD5, etc.). Security data field 824 contains the data needed to implement the algorithm identified by the security type field 822.

Detailed Message Descriptions

Wildcard Affinity Update

Figure 9B:
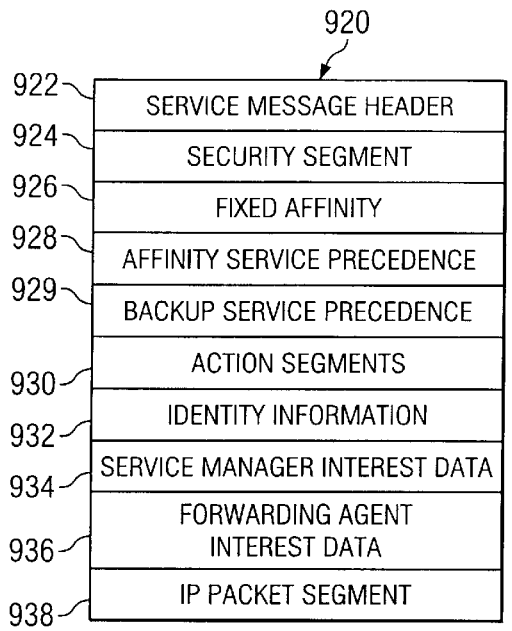
FIG. 9B illustrates a fixed affinity update message that is sent by a service manager to a forwarding agent to add a fixed affinity to the receiver's affinity cache or delete a fixed affinity that is stored in the receiver's affinity cache.
Figure 9A:
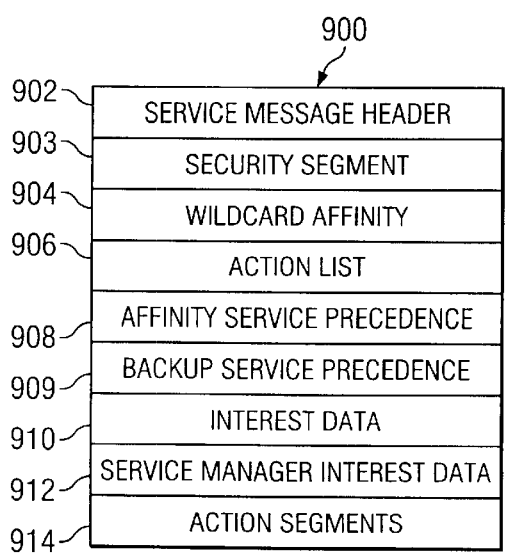
FIG. 9A is a diagram illustrating an affinity update wildcard message.

FIG. 9A is a diagram illustrating an affinity update wildcard message. Affinity update wildcard message 900 is sent by a service manager to a forwarding agent to register or unregister for classes of flows that match the specified sets of flows. It includes a service message header 902 followed by a sequence of message segments. A security segment 903 is optional, as dictated by the needs of the receiver. A wildcard affinity segment 904 is required, since the purpose of the affinity update wildcard message is to send a wildcard. An action list segment 906 is optional. Its purpose is list the actions that a forwarding agent must support in order to receive the affinity. If the forwarding agent determines that any of the actions are not supported, then it may send an affinity update deny message to the service manager.

An affinity service precedence field 908 is optionally used to specify the precedence of the service being provided. This allows multiple service managers or a single service manager to send wildcard affinities for different services. An affinity backup precedence field 909 is also optionally used to specify the backup precedence of the service manager that sent the affinity. This allows a backup service manager to send wildcard affinities that are ignored until a higher backup service precedence wildcard affinity that corresponds to a primary service manager is deleted. An identity information segment 910 is optionally used to identify the manager. This information may be used, for example, in an error message on the console of the forwarding agent to indicate which service manager had a problem. A service manager interest data segment is optionally used to include data that should be returned to the service manager when an interest match-wildcard affinity message is sent to the service manager as a result of a forwarding agent determining a wildcard affinity match. Finally, one or more action segments are optionally included. The action segments specify actions that are performed on the packets for the purpose of providing a network service. It should be noted that in some embodiments, fields which are described above as optional may become required and required fields may be optional. This is also generally true of the other message descriptions contained herein.

Fixed Affinity Update

FIG. 9B illustrates a fixed affinity update message that is sent by a service manager to a forwarding agent to add a fixed affinity to the receiver's affinity cache or delete a fixed affinity that is stored in the receiver's affinity cache. If the time to live in the fixed affinity segment is non-zero, the affinity is added to the cache (or refreshed, if it already resides there) for the number of seconds specified in the time to live. If time to live is zero, the fixed affinity is removed from the cache if it is found there.

Fixed affinity update message 920 includes a service message header 922. An optional security segment 924 is included as dictated by the needs of the receiver. A fixed affinity segment 926 includes the fixed affinity being sent. An affinity service precedence 928 optionally specifies a service precedence. An affinity backup precedence field 929 is also optionally used to specify the backup precedence of the service manager that sent the affinity. This allows a backup service manager to send affinities that are ignored until a higher backup service precedence affinity that corresponds to a primary service manager is deleted. One or more action segments 930 are optionally included to specify actions to be performed by the receiver for matching packets. An identity information segment 932 is optionally used to identify the service manager that sent the fixed affinity. A service manager interest data segment 934 is optionally used to include data that should be returned to the service manager when an interest match-wildcard affinity message is sent to the service manager as a result of a forwarding agent determining a wildcard affinity match. A forwarding agent interest data segment 936 is optionally used to include data that a forwarding agent requested to be returned to it along with a fixed affinity. Finally, an IP packet segment 938 includes an IP packet.

Usually, the IP packet segment is an IP packet that was sent to a service manager as a result of a wildcard affinity match and that is being sent back to a forwarding agent along with actions to be performed for the packet. In many implementations, the forwarding agent does not devote resources to storing packets that have matched a wildcard affinity and have been forwarded to a service manager. Therefore, the forwarding agent sends the packet to the service manager along with an interest match message and the service manager sends the packet back to the forwarding agent with a fixed affinity update. Thus, the service manager stores the packet for the forwarding agent and returns it to the forwarding agent when the forwarding agent needs to execute an action on the packet. This eliminates the need for storage and garbage collection at the forwarding agent for packets that matched a wildcard affinity and are awaiting instructions from a service manager for handling. In some implementations, the forwarding agents may temporarily store packets that have matched a wildcard affinity. However, it has been found that sending packets to the service manager and having the service manager return packets with fixed affinities simplifies and improves the performance of the forwarding agent.

Affinity Update-deny

Figure 9C:
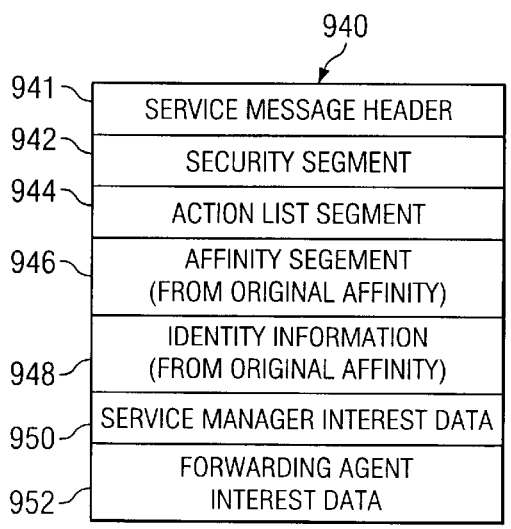
FIG. 9C is a diagram illustrating an affinity update-deny message.

FIG. 9C is a diagram illustrating an affinity update-deny message. An affinity update-deny message is sent by the forwarding agent to a service manager when the forwarding agent receives an affinity update with a required segment that it cannot process (one where the 'Required' flag is set either within the segment header or within the list of segment types from the action list, if one was included). The segments that cannot be processed properly are identified in the action list that is returned with the affinity update-deny message.

Affinity update-deny message 940 includes a service message header 941. An optional security segment 942 is included as dictated by the needs of the receiver. An action list segment 944 includes actions that are not supported by the forwarding agent and that caused the forwarding agent to sent the affinity update-deny message. An affinity segment 946 from the original affinity update that prompted the affinity update-deny message is optionally included. An identity information segment 948 is from the original affinity update that prompted the affinity update-deny message is also optionally included. A service manager interest data segment 950 is optionally used to include data that the service manager sent to the forwarding agent for the forwarding agent to send back to the service manager when an interest match-wildcard affinity message is sent to the service manager. The service manager interest data is used by the service manager to help process the message. A forwarding agent interest data segment 952 is optionally used to include data that the forwarding agent requests to be returned to it along with a fixed affinity.

Interest Match (Wildcard Affinity or Fixed Affinity)

Figure 9D:
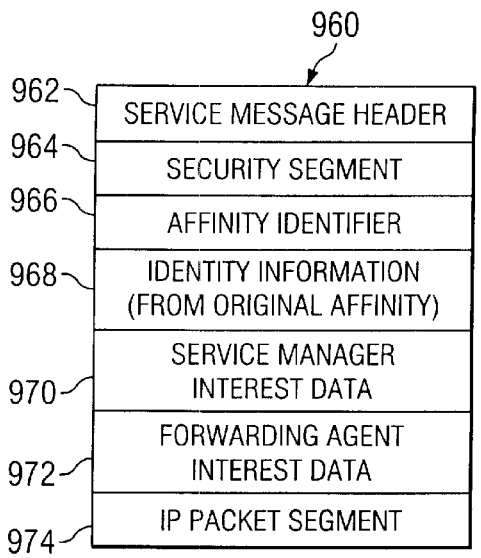
FIG. 9D is a diagram illustrating an interest match message for either a wildcard affinity or a fixed affinity.

FIG. 9D is a diagram illustrating an interest match message for either a wildcard affinity or a fixed affinity. Interest match message 960 is sent by the forwarding agent to a service manager when an IP packet matches the interest criteria that was sent the last time the matching affinity was refreshed or added in the cache. Interest match message 960 includes a service message header 962. An optional security segment 964 is included as dictated by the needs of the receiver. An affinity identifier segment 966 includes the affinity key of the affinity that caused the match, the dispatch and information flags of that affinity, and an interest match field that provides reasons from the interest criteria that caused the match. In one embodiment, a bit vector is used to provide the reasons.

An identity information segment 968 is optionally included from the original affinity update that prompted the interest match message to be sent. A service manager interest data segment 970 is optionally used to include data that the service manager requested when an interest match message is sent to the service manager. A forwarding agent interest data segment 972 is optionally used to include data that a forwarding agent requested to be returned to it along with a fixed affinity. Finally, an IP packet segment is optionally included so that the forwarding agent can send the IP packet that caused the affinity match to the service manager. The IP packet is sent if the corresponding data flag in the interest criteria indicated that the IP Packet should be sent. The IP packet may be sent as a segment of the interest match message or may be forwarded independently in a subsequent IP Packet message, depending on the capabilities of the forwarding agent.

IP Packet Only

Figure 9E:
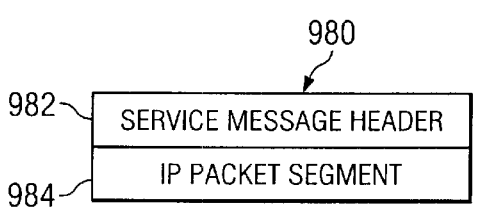
FIG. 9E is a diagram illustrating an IP packet only message.

FIG. 9E is a diagram illustrating an IP packet only message. IP packet only message 980 is sent by a forwarding agent to a service manager or vice versa whenever an IP network packet is sent from one to the other. This can occur in a number of situations, e.g.:

(1) When a forwarding agent needs to send a service manager a packet that could not be included with an interest match message.

(2) When a forwarding agent needs to send a service manager a packet that matched a service manager wildcard affinity.

(3) When a service manager needs to send a forwarding agent a packet that it has processed and that needs to be forwarded to the next appliance (or, if there are no other appliances, to its correct destination). Encapsulating IP packets in the IP packet only message avoids loops in the system by signaling the forwarding agent that the packet has already been to the manager and need not be sent there again.

IP packet only message 980 includes a service message header 982. An IP Packet segment 984 includes the IP packet. Preferably IP packet only message 980 does not include a security segment, since the flow is essentially just another IP hop and faster forwarding can be achieved without a security segment.

The messages sent between forwarding agents and service managers have now been described in some detail. The wildcard affinity segment, the fixed affinity segment, and the security segment have also been described. The remaining message segments are described in greater detail below in connection with FIGS. 10A through 101. It should be noted that each segment includes, in addition to the fields that are shown, a segment header.

Figure 10A:
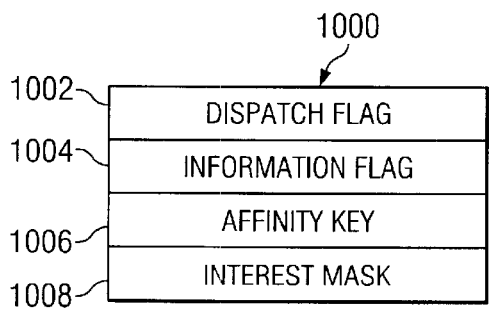
FIG. 10A is a diagram illustrating an affinity identifier segment.

FIG. 10A is a diagram illustrating an affinity identifier segment. Affinity identifier segment 1000 includes a dispatch flag 1002, an information flag 1004, and an affinity key 1006. These fields are defined the same as they are defined for fixed affinities and wildcard affinities. Affinity identifier segment 1000 also includes an interest mask 1008 that provides reasons from the interest criteria sent by the service manager that caused the match. This gives the service manager notice of what affinity caused the match and also what interest criteria in that affinity caused the match. The interest criteria action specified in an affinity sent by a service manager is described further below.

Figure 10B:
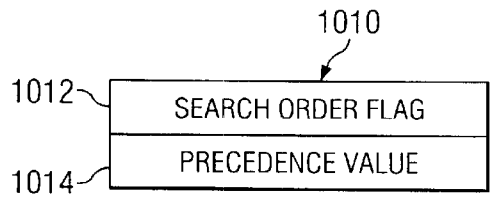
FIG. 10B is a diagram illustrating an affinity service precedence segment.

FIG. 10B is a diagram illustrating an affinity service precedence segment. Affinity service precedence segment 1010 includes a search order flag 1012 that specifies the search order for the precedence, i.e., whether a higher priority precedence is represented by a higher or a lower priority number. A precedence value field 1014 actually provides the precedence value. The service precedence enables one or more service managers to provide different services that are executed in sequential order based on the precedence values provided. In this manner, multiple affinities may be specified that match a flow, with each affinity corresponding to a different service that specifies different actions to be performed for packets in the flow. A packet for such a flow may be forwarded to several service managers before it is eventually sent to the client or the specific server. It should be noted that only the last service manager can dispatch the packet since the packet must be returned by higher priority service managers to the forwarding agent for further processing by lower priority service managers.

Thus, the affinity service precedence allows multiple service managers of different types to control the same flow. The value of the precedence dictates the order in which the forwarding agent should process affinities if multiple matches occur. When a matching affinity contains an action that requires the packet to be sent to a service manager, the action is honored. When the packet is returned, the forwarding agent processes the affinity contained in the response and continues with the matching affinity of the next highest precedence.

Figure 10C:
FIG. 10C is a diagram illustrating a service manager interest data segment.

FIG. 10C is a diagram illustrating a service manager interest data segment. Service manager interest data segment 1020 includes an interest data field 1021 that can contain anything that the service manager arbitrarily determines. This is simply data that can be sent by the service manager to the forwarding agent. The forwarding agent returns the data to the manager with an interest match message when an interest match is determined. Typically, this data is used to index the affinity.

Figure 10D:
FIG. 10D is a diagram illustrating a forwarding agent interest data segment.

FIG. 10D is a diagram illustrating a forwarding agent interest data segment. Forwarding agent interest data segment 1022 includes an interest data field 1023 that can contain anything that the forwarding agent arbitrarily determines. This is simply data that can be sent by the forwarding agent to the service manager when an interest match is sent to the service manager. The service manager returns the data to the forwarding agent with any fixed affinity update message that is sent as a result of the interest match. Typically, this data is used to index the affinity.

Figure 10E:
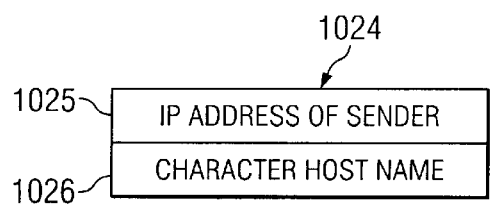
FIG. 10E is a diagram illustrating an identity information segment that is used to identify the sender of a service message.

FIG. 10E is a diagram illustrating an identity information segment that is used to identify the sender of a service message. The identity information may be used for logging and debugging. Identity information segment 1024 includes an IP address field 1025 that contains the IP address of the message sender. A character field 1026 contains the name of the host.

Figure 10F:
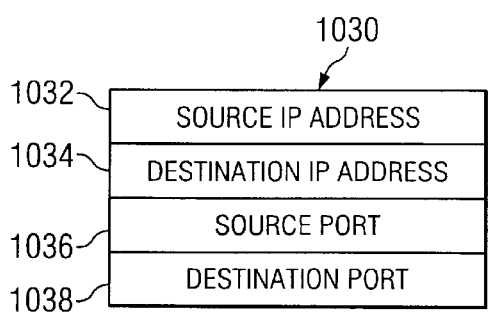
FIG. 10F is a diagram illustrating a NAT (Network Address Translation) action segment.

FIG. 10F is a diagram illustrating a NAT (Network Address Translation) action segment. NAT action segment 1030 includes fields that specify a source IP address 1032, a source port 1034, a destination IP address 1036, and a destination port 1038 that are to replace the corresponding fields in the packet. The NAT action segment thus specifies that NAT is to be performed on any packet that matches the associated affinity. A NAT action segment can be included with any Wildcard or Fixed affinity sent by a service manager to a forwarding agent. The action is not performed on packets that are forwarded to the service manager. If the packet is forwarded to the service manager, then the packet is not immediately altered. If the service manager sends the packet back to the forwarding agent for forwarding, the action is performed by the forwarding agent at that time, therefore removing the need for the manager to implement that function directly.

Figure 10G:
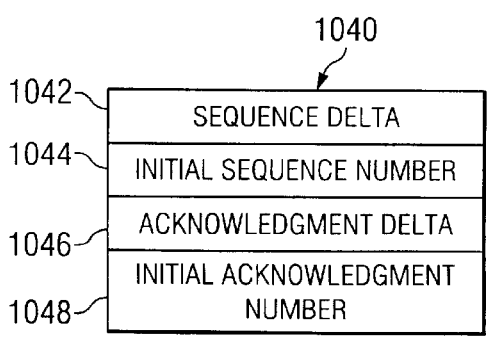
FIG. 10G is a diagram illustrating a sequence number adjust action segment.

FIG. 10G is a diagram illustrating a sequence number adjust action segment. Sequence number adjust action segment 1040 specifies that a forwarding agent should adjust sequence numbers and ACK numbers in the TCP packets that match the associated affinity. A sequence number adjust action segment can be included with any wildcard affinity or fixed affinity sent by a service manager. The sequence number adjust is not performed on packets that are forwarded to the service manager The action may be performed when the service manager returns the packet back to the forwarding agent for forwarding.

A sequence delta field 1042 specifies the amount by which the sequence number in packets is to be adjusted. An initial sequence number 1044 specifies the lowest sequence number to which the delta is to be applied. An ACK delta field 1046 specifies the amount by which to adjust the ACK number. An Initial ACK number field 1048 specifies the lowest ACK number to which ACK Delta is to be applied. Thus, sequence numbers and ACK numbers in packets can be modified by forwarding agents according to a scheme determined by a service manager. The scheme is sent to the forwarding agents using the sequence number adjust action segment.

Figure 10H:
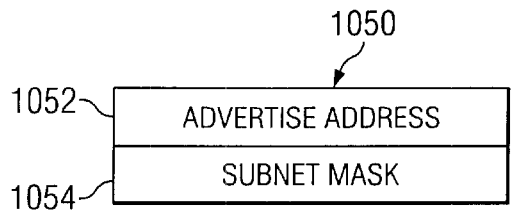
FIG. 10H is a diagram illustrating an advertise action segment.

FIG. 10H is a diagram illustrating an advertise action segment. An advertise action segment is sent by a service manager to a forwarding agent to specify that the destination IP address in an enclosed wildcard affinity is to be advertised by the forwarding agent. That means that the address is included in routing protocol updates, just as if the destination IP address belonged to a device connected to the router. The address advertisement is deleted when the associated wildcard affinity is deleted. By directing a forwarding agent to advertise an address, the service manager can simulate the presence of an network service appliance at the location of the forwarding agent. For example, if the service manager is providing load balancing among a group of hosts, the service manager would direct a forwarding agent to advertise the virtual IP address of the cluster of hosts. Thus, the virtual IP address can be advertised as if a load balancer at the location of the forwarding agent were advertising the virtual IP address. If a forwarding agent receives a packet destined for the advertised address, but that packet does not match an affinity (either Full or Wildcard), the packet is dropped. This avoids establishing connections to the forwarding agent for ports that no service manager is supporting.

Advertise action segment 1050 includes an advertise address 1052, which is the address to be advertised by the forwarding agent. A subnet mask 1054 may also be used for such advertising. If a subnet mask is used, then the IP address and mask combination indicates a subnet to be advertised. The advertise segment can also be used without specifying a subnet mask.

Figure 10J:
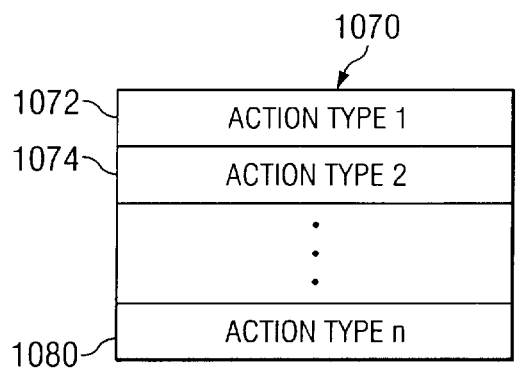
FIG. 10J is a diagram illustrating an action list segment.
Figure 10I:
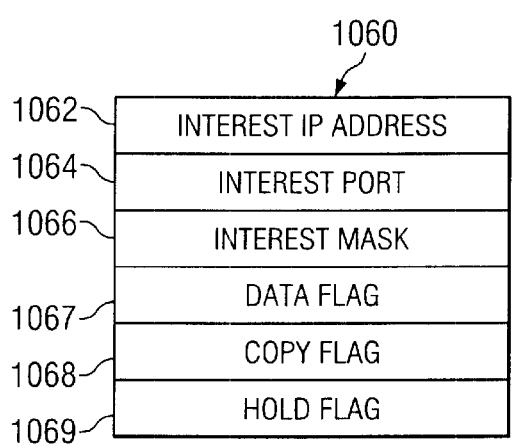
FIG. 10I is a diagram illustrating an interest criteria action.

FIG. 10I is a diagram illustrating an interest criteria action. Interest criteria action 1060 is sent by a service manager to a forwarding agent to specify that the service manager is to be informed when certain types of special packets are detected by the forwarding agent. Interest criteria action 1060 includes an interest IP address 1062 and an interest port 1064. The interest IP address and port specify an IP address and port to which the interest match message is to be sent. An interest mask 1066 is bit vector that specifies the types of packets for which the service manager is requesting notification. The type of packet specified by the bits may be a function of the protocol type specified in the affinity encapsulated with the interest criteria action. For example if the protocol is TCP, then in one embodiment, the bits are interpreted as follows:

Bit 0=1::FIN
Bit 1=1::SYN
Bit 2=1::RST
Bit 3=1::PSH
Bit 4=1::ACK
Bit 5=1::URG
Bit 6=1::Data Present
Bit 7=1::First Data present
Bit 8=1::Fragmented packet, and the source/destination IP addresses match
Bit 15=1::All Packets If the protocol is UDP, then the bits are interpreted as follows:

Bit 6=1::Data Present
Bit 7=1::First Data present
Bit 8=1::Fragmented packet, and the source/destination IP addresses match
Bit 15=1::All Packets For other protocols, Bit 15 may be set to indicate all packets.

A data flag 1067 uses the same bit code as the interest mask. Whereas the interest mask determines whether the service manager should be forwarded an interest match message, data flag 1067 specifies whether the service manager is to receive a copy of the packet that caused the interest match with the interest match message. If a bit is set, then the forwarding agent is to send the packet as well as the interest match to interest IP address 1062 and interest port 1064. It should be noted that in some embodiments, the forwarding agents may send messages and forward packets to service managers over a different network so that the interest IP address and interest port may not be used or some other method may be used for specifying where interest match messages and packets should be sent to the service manager.

A copy flag 1068 also uses the same bit code as the interest mask. Each bit specifies whether a copy of the matching packet is to be forwarded to the server. If the bit is set for the packet type, the forwarding agent sends a copy of the matching packet and refers to a hold flag 1069 to determine what to do with the original packet. Hold flag 1069 also uses the same bit code as the interest mask. Hold flag 1069 determines whether the forwarding agent forwards the packet to the service manager or, if possible, holds the packet and waits for the service manager to send a fixed affinity that specifies how the packet should be forwarded by the forwarding agent. If the bit is not set for the packet type, then the forwarding agent forwards the packet. If the bit is set, then the forwarding agent holds the packet, if possible. If the packet cannot be held by the forwarding agent for some reason (e.g., lack of storage) then the forwarding agent forwards the packet to the Manager.

FIG. 10J is a diagram illustrating an action list segment. Action list segment 1070 is sent by a service manager to a forwarding agent with wildcard affinities to specify all the actions that must be supported in order for the forwarding agent accept the wildcard affinity. Action list segment 1070 does not specify that the actions are to be performed. Its purpose is to warn the forwarding agent of the service requirements. The forwarding agent responds with an affinity update-deny and discards a wildcard affinity if the forwarding agent cannot support all the actions in an action list that is provided with the wildcard affinity. Action list segment 1070 includes a first action type 1072. Action list segment 1070 may also include a second action type 1074 and other action types up to an nth action type 1080.

A service message protocol for sending messages and packets between service managers and forwarding agents has been defined in FIGS. 6–10J. Each service message includes a service message header that identifies the message type. After the service message header, each service message includes one or more segments, depending on the message type. Each segment begins with a segment header. Using the message types described, service managers can send forwarding agents instructions detailing certain sets of packets that the service manager wants to either to be forwarded to the service manager or to cause an interest match message to be sent to the service manager. Messages are also used to specify actions for certain packets in certain flows.

For example, if a service manager is providing load balancing, the service manager first sends a wildcard affinity update message to a forwarding agent specifying a set of clients that the service manager will load balance. The wildcard affinity may also include an action that directs the forwarding agent to advertise a virtual IP address for a virtual machine that includes all of the load balanced servers. When the forwarding agent intercepts a packet that matches the wildcard affinity, then the forwarding agent sends an interest match message to the service manager. The service manager then determines a server to assign the connection (or the server that has already been assigned the connection) and sends a fixed affinity to the forwarding agent that directs the forwarding agent to dispatch the packet to that server or to use NAT to substitute the server's address in the packet. The service manager also may include an interest criteria in a fixed affinity that specifies that future packets for the flow should not be sent to the service manager, but that the service manager should be notified if certain types of packets such as a FIN or a FIN ACK are received. At any point, the service manager may cancel a fixed affinity or a wildcard affinity sent to a forwarding agent by sending a fixed affinity or a wildcard affinity with a time to live of 0.

Thus service managers are able to control affinities and monitor flows using the above defined messages. When a forwarding agent receives a packet, affinities received from service managers are searched first for the one with the highest service precedence. Once a match is determined, the search order defined for that precedence is used to find another identical Affinity with a better service precedence. If multiple affinities exist with the same best service precedence, they are searched for the one with the lowest backup precedence value.

Service managers manage the storage of affinities on forwarding agents using the time to live portion of the affinity segments. The forwarding agents remove affinities at intervals specified by the service manager if they have not already been removed at the request of a manager (via an affinity update message with a time-to-live of zero). No affinity is kept for an interval longer than the interval specified by the time-to-live set by the manager (within a tolerance of +/-2 seconds in one embodiment) so that the manager can reliably assume that the affinities have been cleared at some small time beyond that interval that accounts for any propagation or processing delays. This simplifies the managing of affinities by the service manager across multiple routers. In some cases, a forwarding agent may need to ask for an affinity again if more traffic arrives for that affinity after it has been deleted.

The service manager itself stores affinities long enough to allow forwarding agents sufficient time to delete their own copies. If an affinity is allowed to expire at a service manager, it must be kept by the service manager long enough so that the forwarding agents have deleted their copies first. This avoids mismatches of affinities across routers should a new affinity assignment request be received while a router still has the old affinity.

Service managers also keep affinities long enough after an outbound FIN is detected for a connection so that the final inbound ACK (or in the case of many Windows web browsers, the inbound RST) can be forwarded to the appropriate host. The use of a 'sticky' timer at the service manager satisfies this requirement. If a service manager changes an affinity at a time when it is possible that the affinity is still cached by a forwarding agent, the service manager asks the forwarding agents to delete the affinity before sending the updated affinity.

It should be noted that fixed affinities and wildcard affinities do not themselves include actions in the data structures described above. For flexibility, actions are defined separately but are included with fixed affinities or wildcard affinities in an affinity update message. The associated actions are stored along with the fixed affinity or wildcard affinity on service managers and forwarding agents. Whenever a fixed affinity or a wildcard affinity is referred to as being stored on a forwarding agent or a service manager, it should be understood that associated actions may be stored with the affinity, whether or not such actions are explicitly mentioned.

Likewise, other items may be included in a stored affinity data structure. For example, the affinity may include a time to live when it is sent by a service manager. When the affinity is received by a forwarding agent, the forwarding agent may compute an expiration time from the time to live and store the expiration time along with the fixed affinity.

An architecture that includes service managers and forwarding agents for providing network services has been disclosed. A message protocol for sending messages from service managers to forwarding agents and for reporting activity and forwarding packets from forwarding agents to service managers has been disclosed as well.

Wildcard affinities are used by the service manager to specify flows that the service manager is handling. These wildcard affinities allow multiple service managers to utilize the same network of forwarding agents to execute their instructions.

Figure 11:
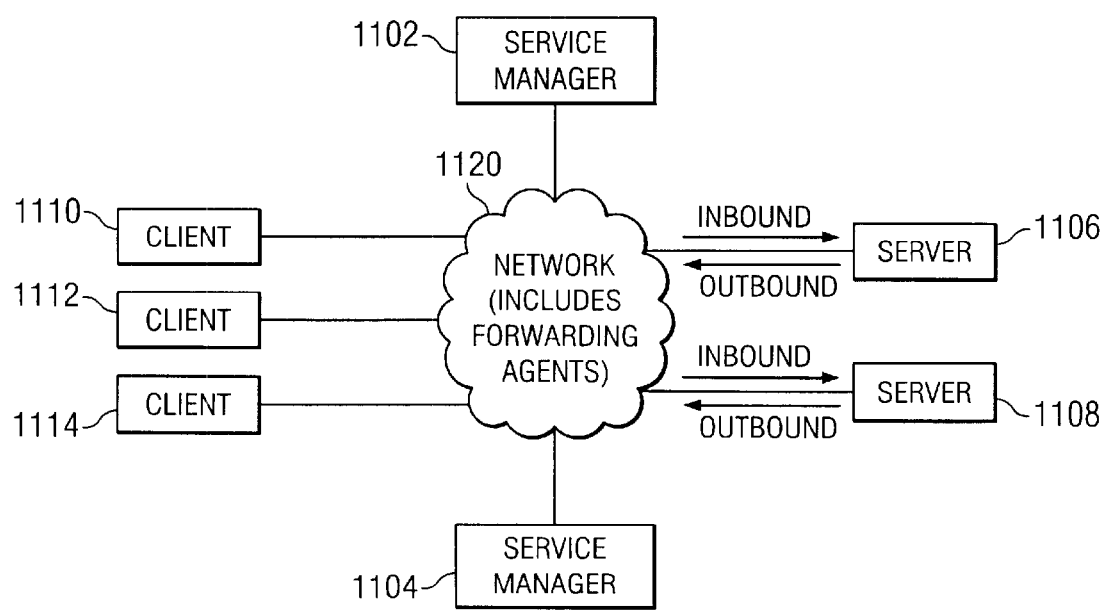
FIG. 11 is a block diagram illustrating a system that includes two service managers.

FIG. 11 is a block diagram illustrating a system 1100 that includes two service managers 1102 and 1104. For purposes of this example, service managers 1102 and 1104 both provide load balancing for connections made to a virtual machine that includes servers 1106 and 1108. For each connection, there is an inbound flow and an outbound flow to each of the servers.

Clients 1110, 1112, and 1114 access the servers through a network 1120. Network 1120 includes forwarding agents that are in communication with the service managers either via the network or through some other connection that allows service managers and forwarding agents to communicate. The clients shown are intended to represent many clients that are connected to the network and that may access the virtual machine. Service manager 1102 and service manager 1104 send wildcards to the forwarding agents in the network that divide up the client population among the service managers so that connections are distributed between the service managers in a manner determined by the configuration of the service managers.

Figure 12:
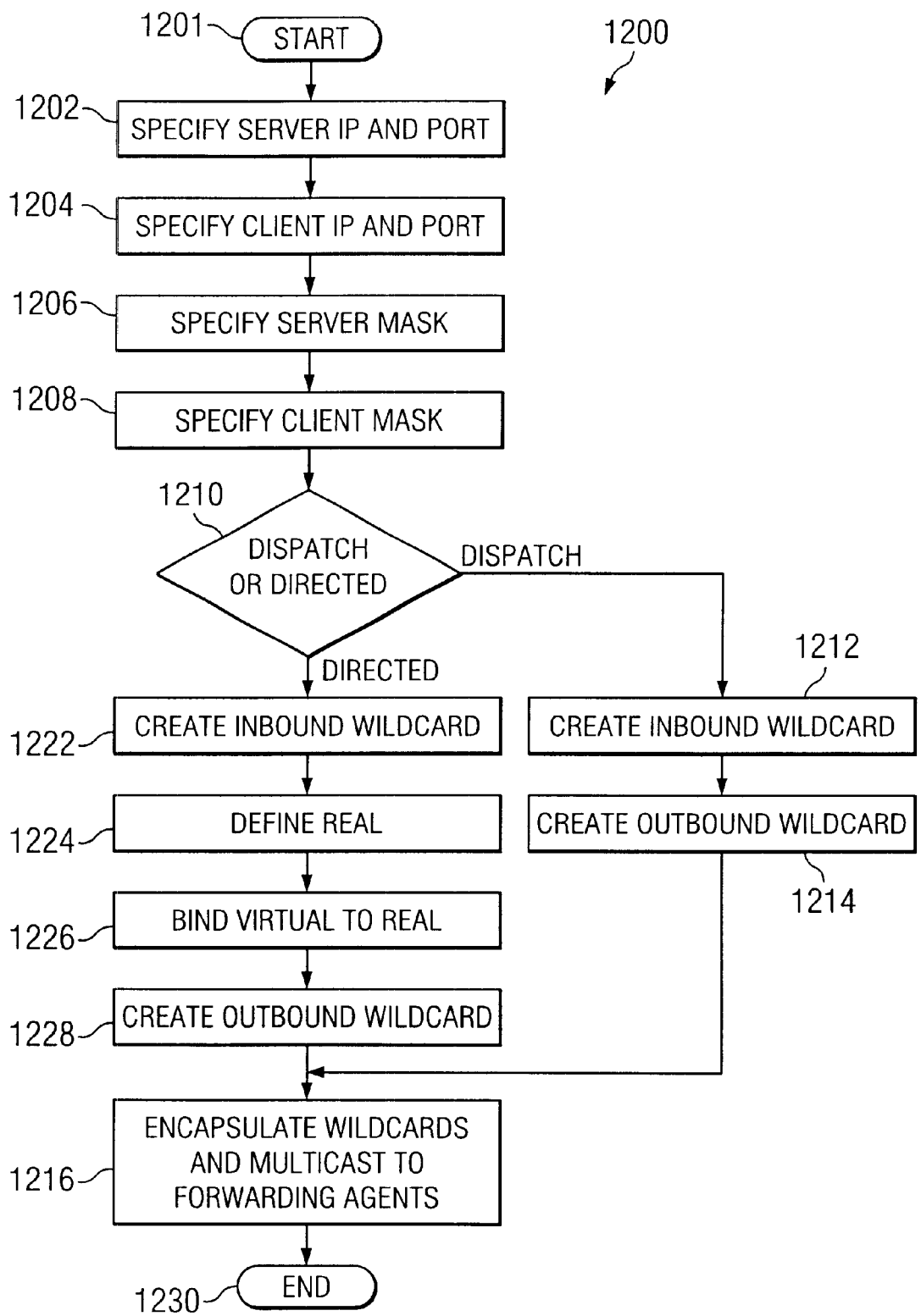
FIG. 12 is a flow chart illustrating how a service manager defines a wildcard affinity to send to forwarding agents based on the connections that the service manager is configured to handle.

FIG. 12 is a flow chart illustrating how a service manager defines a wildcard affinity to send to forwarding agents based on the connections that the service manager is configured to handle. Process 1200 will be referred to in the context given in FIG. 11 of two service managers providing load balancing for two servers.

The process starts at 1201. The server IP address and port number are specified in a step 1202. A client IP address and port number are specified in a step 1204. Next, in a step 1206 a server mask is specified and in a step 1208, a client mask is specified.

The client and server IP addresses and masks are used by a service manager in one embodiment to specify certain sets of packets that the wildcard affinity will match. On the client side, the client IP address and the client mask are ANDed together and a packet IP address and the client mask are also ANDed together and the results of those two operations are compared to determined whether a match has occurred. If a match has occurred, then the packet is handled according to the wildcard. Likewise on the server side, the server IP address is ANDed with the server mask and the packet IP address is ANDed with the server mask as well and the results of those two operations are compared to determine whether the packet matches the wildcard. It should be noted that a protocol may also be specified and checked in the manner described above.

In the discussion above, the client IP address and the server IP address have been referred to for the purpose of describing the comparisons made to determined a match. However, wildcard affinities do not contain client and server IP addresses, but rather include source and destination IP addresses and masks. That is because wildcard affinities are defined for each flow, including an inbound flow toward the server and an outbound flow from a server. For inbound flows, the client IP address and mask is specified in a wildcard affinity as the source IP address and mask and the server IP address and mask is specified as the destination IP address and mask. For outbound flows from the server, those designations are reversed.

FIG. 13A is a diagram illustrating the designations for an inbound wildcard, a dispatched outbound wildcard, and a directed outbound wildcard. Inbound wildcards cause inbound packets from clients to a server for new connections to be intercepted by forwarding agents and redirected to a service manager so that the service manager can select a server to handle the connection and send fixed affinities with appropriate instructions to the forwarding agents. Outbound wildcards cause packets from a server to a client to be intercepted so that such packets may be counted or modified, if necessary.

The distinction between a dispatched outbound wildcard and a directed outbound wildcard is that dispatched outbound wildcards specify as a source IP address a virtual IP address and directed outbound wildcards specify as a source IP address a real IP address. That is because when inbound traffic that is directed (using NAT) to the server, the server returns packets with the real server IP address as the source IP address. If the inbound traffic is dispatched, then the server returns packets with the virtual IP address as the source IP address. It should be noted that in some embodiments, a server may reply to dispatched packets with a real IP address or a server may reply to directed packets with a virtual IP address. In such cases, appropriate changes are made to the wildcard affinities. The addresses shown in FIG. 13A correspond to a situation where a service manager is set up to handle all traffic from all clients to a virtual IP address 10.10.10.10 directed to port 23, i.e., all telnet traffic for a virtual machine at address 10.10.10.10. First, the client IP address and the client mask are specified so that all packet IP addresses ANDed with the client mask equal the client address ANDed with the client mask. Thus, for inbound wildcards, a client mask that causes all client addresses to match the wildcard is specified as the source mask and a destination address and mask are specified as the that match only 10.10.10.10. The source port is specified as zero, signifying any port on the client, and the destination port is specified as 23, specifying that only traffic for port 23 on the server matches the wildcard.

For the dispatched outbound wildcard, the source address and mask are specified so that only packets with a source address matching 10.10.10.10 will match and all destination addresses in all packets will match. The source port must match port 23 and the destination port can be any destination port because the destination port specified is zero.

The directed outbound wildcard is the same as the dispatched outbound wildcard except that the source address is specified as 10.10.10.123. 10.10.10.123 is the IP address of a specific server that has been assigned the connection. The difference between dispatched and directed traffic is that dispatch traffic is forwarded directly from a forwarding agent to a specific server without translating the destination IP address of the packet. In other words, if a packet is dispatched, then the packet destination address is not used to forward the packet. Instead, a forwarding address contained in an affinity is used to forward the packet. If the connection is not dispatched but directed by the forwarding agent, then the packet IP destination must be translated using NAT to direct the packet to a specific server.

For outbound packets from a server, dispatched packets are given the virtual IP address of the server as a source IP address and directed packets are given the real IP address of the server as a source IP address. Thus, the directed outbound wildcard source address is specified as 10.10.10.123 and the dispatched outbound wildcard source address is specified as 10.10.10.10.

The result of defining these wildcards and distributing the wildcards to forwarding agents is that inbound packets from clients will match the inbound wildcard if their destination address is 10.10.10.10 and their source address is any source address, their source port is any source port, and the destination port is port 23. An outbound packet coming from a server will match the outbound wildcard if the destination address of the packet is any destination address, the destination port is any destination port, the source port is port 23 and the source address is either 10.10.10.10 or 10.10.10.123 depending on whether the packet is dispatched or directed.

In the embodiment described, if the mask is 255.255.255.255, then a match will only occur if the packet address includes a 1 in every position that the affinity address includes a 1 and a 0 in every place the affinity address includes a 0. If the mask is 0.0.0.0, then all packet addresses will match.

FIG. 13B is a diagram illustrating in general how the client IP address and mask, the server IP address and mask, the client port and the server port are mapped to source and destination IP addresses, masks and ports. For an inbound wildcard, the source address, source mask and source port are specified to match the client and the destination address, destination mask and destination port are specified to match the server. These designations are reversed for outbound wildcards.

Returning to FIG. 12, once the client IP address, mask, and port has been specified along with the server IP address, mask and port, control is transferred to a step 1210 where it is determined whether the connection is to be directed or dispatched. If the connection is to be directed, then control is transferred to a step 1222 and an inbound wildcard is created with the IP address, mask, and port mappings described above. Next, a virtual machine must be selected to handle the connection so that the directed outbound wildcard source IP address can be specified. In a step 1226, the virtual machine is bound to the real machine. This defines the outbound source IP address. It should be noted that this may also change the source port designation if a server port number that services traffic to a virtual machine port number is a different port number. Next, in a step 1228, the outbound wildcard is created.

If, in step 1210, the wildcard corresponds to a connection that is dispatched by forwarding agents and not directed, then control is transferred to a step 1212 where an inbound wildcard is created. Next, in a step 1214, an outbound wildcard is created. In a step 1216, the wildcards are then encapsulated and multicast to forwarding agents. The process ends at 1230. When dispatch is used, the forwarding agent needs exactly one outbound wildcard, regardless of the number of servers. If packets are being directed, then the forwarding agent needs an outbound wildcard for each real server.

Thus, a method of defining wildcards sent by service managers to forwarding agents for the purpose of specifying flows that are of interest to the service manager has been described. In the embodiment shown, an IP address and mask is used to specify sets of IP addresses that are intended to match the wildcard. It should be noted that in other embodiments other methods of specifying sets of IP addresses are used. For example, in one embodiment, a range of IP addresses is used. In general, different schemes are used to specify certain sets of IP addresses. The mask scheme described above is particularly useful for specifying every other IP address, every fourth IP address, or every eighth IP address and so on according to powers two.

Certain applications may make use of such assignments to provide additional service managers to handle different partitions of client traffic. In other applications, it may be useful to specify that all clients in a certain subnet will be mapped to one server and all clients in other subnets will be mapped to another server or set of servers. In other applications, all clients with a certain range of IP addresses may be mapped to a single server. In general, client connections may be distributed among service managers by address, by protocol or by port.

In any event, clients maybe transferred among different service managers without reconfiguring forwarding agents or clients. The client mapping need only be specified at the service managers. The service managers send wildcard affinities to clients that cause the appropriate packets to be directed to the appropriate service managers. In some systems, an administrator is relied upon to consistently set up the service managers. In other systems, a service manager coordinator is used to specify configuration commands for all service managers and distribute the commands among service managers.

Although the foregoing invention has been described in some detail for purposes of clarity of understanding, it will be apparent that certain changes and modifications may be practiced within the scope of the appended claims. It should be noted that there are many alternative ways of implementing both the process and apparatus of the present invention. Accordingly, the present embodiments are to be considered as illustrative and not restrictive, and the invention is not to be limited to the details given herein, but may be modified within the scope and equivalents of the appended claims.

What is claimed is:

1. A method of partitioning a network service among a plurality of service managers, comprising:

receiving a first portion of a traffic flow at a first forwarding agent, wherein the traffic flow propagates from a network and is initiated by one or more clients;

receiving a second portion of the traffic flow at a second forwarding agent;

checking packets included in the traffic flow at the forwarding agents to determine whether the packets meet a first criteria or a second criteria;

processing the packets based on the determination of whether they meet the first or second criteria in order to direct one or more of the packets to a selected one of a plurality of servers; and receiving instructions from a first service manager at the first forwarding agent, the instructions including an affinity key that indicates how to manage selected packets, wherein the affinity key may be used by the service manager to identify which flows that include the packets should propagate through the first forwarding agent, and wherein the affinity key includes a selected one or more of a group of elements consisting of:

a source internet protocol (IP) address;
a destination IP address;
a source port number;
a destination port number; and
a protocol identification.

2. The method of claim 1, further comprising:

receiving packets that meet the first criteria at the first service manager; and receiving packets that meet the second criteria at a second service manager; wherein each of the service managers is coupled to the first and second forwarding agents.

3. The method of claim 2, wherein the first forwarding agent encapsulates the packets that meet the first criteria before communicating the packets to the first service manager, and wherein the second forwarding agent encapsulates the packets that meet the second criteria before communicating the packets to the second service manager.

4. The method of claim 2, wherein the first and second service managers provide a decision-making capability for the first and second forwarding agents in order to perform packet processing operations on the packets, the packet processing operations being selected from the group consisting of:

routing of the packets;
gathering statistics about the packets;
modifying an internet protocol (IP) address associated with a selected one or more of the packets;
tunneling of the packets to a destination different from a standard destination as reflected by an IP address included in each of the packets; and
executing tag switching on the packets.

5. The method of claim 4, wherein the decision-making capability is related to one or more network parameters associated with the packets, the network parameters being selected from the group consisting of:

load balancing;
caching; and
security.

6. The method of claim 1, wherein the packets that meet the first criteria do not meet the second criteria and vice versa.

7. The method of claim 2, wherein one or more requests are generated and multicasted from the first and second service managers to a plurality of forwarding agents.

8. The method of claim 1, wherein the first and second forwarding agents are implemented on a selected one of first and second routers respectively, and first and second switches respectively.

9. The method of claim 7, wherein the requests are communicated via a dedicated connection.

10. The method of claim 2, wherein the first forwarding agent verifies that the instructions communicated from the first service manager correspond to the packets that meet the first criteria.

11. The method of claim 2, wherein the affinity key includes information associated with a selected one of loadbalancing and security parameters associated with management of the packets.

12. The method of claim 1, wherein the first forwarding agent receives a time to live parameter associated with a communication between the first forwarding agent and the first service manager coupled to the first forwarding agent.

13. The method of claim 12, wherein the first forwarding agent stores the communication for a time period designated by the time to live parameter and deletes the communication after the time to live parameter has expired.

14. The method of claim 12, wherein the time to live parameter is set to zero and the first forwarding agent immediately deletes the communication.

15. An apparatus for managing information in a network environment, comprising:

a service manager operable to communicate a wildcard affinity update packet to a forwarding agent, wherein the wildcard affinity update packet includes a wildcard affinity element that designates a selected one or more of:

a specification for a set of source internet protocol (IP) addresses;
a specification for a set of destination IP addresses;
a time to live parameter;
a plurality of IP addresses that correspond to selected virtual IP addresses of server clusters that are to be loadbalanced by the service manager; and
instructions that indicate that a packet matching the wildcard affinity element is to be sent to the service manager.

16. The apparatus of claim 15, wherein the specification for the set of source IP addresses includes a netmask element.

17. The apparatus of claim 15, wherein the specification of the set of destination IP addresses includes a netmask element.

18. The apparatus of claim 15, wherein the service manager selects a server from the server cluster and communicates a fixed affinity element to the forwarding agent that instructs the forwarding agent to forward one or more packets from a flow to the selected server.

19. A forwarding agent, comprising:

a service manager receiving interface operable to receive a plurality of requests from a plurality of service managers for packets meeting a plurality of criteria, wherein a selected one or more of the service managers communicate a set of instructions to the service manager receiving interface that includes an affinity key indicating how to manage one or more packets, the affinity key being operable to be used by the service manager to identify which flows that include the packets should propagate through the first forwarding agent, and wherein the affinity key includes a selected one or more of a group of elements consisting of:
a source internet protocol (IP) address;
a destination IP address;
a source port number;
a destination port number; and
a protocol identification;

a network interface operable to receive packets from devices on a network;

a processor operable to check the packets to determine whether the packets meet a selected one of the plurality of criteria; and a service manager sending interface operable to communicate packets that meet one of the plurality of criteria to one of the plurality of service managers that corresponds to the selected one of the plurality of criteria.

20. The forwarding agent of claim 19, wherein one or more of the requests include a time to live parameter, and wherein the processor is further operable to delete each of the plurality of requests after the time to live parameter expires.

21. A system for managing packets, comprising:

means for receiving a first portion of a traffic flow at a first forwarding agent, wherein the traffic flow propagates from a network and is initiated by one or more clients;

means for receiving a second portion of the traffic flow at a second forwarding agent;

means for checking packets included in the traffic flow at the forwarding agents to determine whether the packets meet a first criteria or a second criteria;

means for processing the packets based on the determination of whether they meet the first or second criteria in order to direct one or more of the packets to a selected one of a plurality of servers; and means for receiving instructions that include an affinity key which indicates how one or more of the packets are to be managed, the affinity kev being operable to be used by the service manager to identify which flows that include the packets should propagate through the first forwarding agent, wherein the affinity key includes a selected one or more of a group of elements consisting of:
a source Internet protocol (IP) address;
a destination IP address;
a source port number;
a destination port number; and
a protocol identification.

22. A computer readable medium for handling packets, the medium having code operable to:

receive a plurality of requests from a plurality of service managers for packets meeting a plurality of criteria;

receive packets from a network at a plurality of forwarding agents;

check the packets to determine whether the packets meet a selected one of the plurality of criteria;

communicate selected packets that meet the selected one of the plurality of criteria to a selected one of the plurality of service managers that corresponds to the selected one of the plurality of criteria; and receive instructions that include an affinity key that indicates how to manage selected packets, the affinity key being operable to be used by the service manager to identify which flows that include the packets should propagate through the first forwarding agent, wherein the affinity key includes a selected one or more of a group of elements consisting of:
a source internet protocol (IP) address;
a destination IP address;
a source port number;
a destination port number; and
a protocol identification.

* * * * *

UNITED STATES PATENT AND TRADEMARK OFFICE
CERTIFICATE OF CORRECTION

PATENT NO. : 6,633,560 B1  Page 1 of 1
DATED : October 14, 2003
INVENTOR(S) : Mark Albert et al.

It is certified that error appears in the above-identified patent and that said Letters Patent is hereby corrected as shown below:

<u>Title page,</u>
Item [75], Inventors, delete "Edward A. Kersey" and insert -- Edward C. Kersey --.

<u>Column 31,</u>
Line 35, after "affinity" delete "kev" and insert -- key --.

<u>Column 34,</u>
Line 6, after "affinity" delete "kev" and insert -- key --.
Line 12, after "source" delete "Internet" and insert -- internet --.

Signed and Sealed this

Eighteenth Day of May, 2004

JON W. DUDAS
*Acting Director of the United States Patent and Trademark Office*